United States Patent
Razon et al.

(10) Patent No.: US 11,914,061 B2
(45) Date of Patent: Feb. 27, 2024

(54) SYSTEMS AND METHODS FOR LOCATING A SIGNAL SOURCE

(71) Applicant: Elta Systems Ltd., Ashdod (IL)

(72) Inventors: Aharon Razon, Tel-Aviv (IL); Moshe Fireaizen, Halamish (IL)

(73) Assignee: ELTA SYSTEMS LTD., Ashdod (IL)

( * ) Notice: Subject to any disclaimer, the term of this patent is extended or adjusted under 35 U.S.C. 154(b) by 188 days.

(21) Appl. No.: 17/406,383

(22) Filed: Aug. 19, 2021

(65) Prior Publication Data

US 2021/0382129 A1 Dec. 9, 2021

Related U.S. Application Data

(63) Continuation of application No. 16/232,271, filed on Dec. 26, 2018, now Pat. No. 11,119,180.

(30) Foreign Application Priority Data

Dec. 31, 2017 (IL) .......................................... 256679

(51) Int. Cl.
  *G01S 3/02* (2006.01)
  *G01S 5/02* (2010.01)
  (Continued)

(52) U.S. Cl.
  CPC ........ *G01S 5/02213* (2020.05); *G01S 5/0244* (2020.05); *G01S 5/06* (2013.01);
  (Continued)

(58) Field of Classification Search
  CPC .. G01S 5/0249; G01S 5/02213; G01S 5/0244; G01S 5/06; G01S 5/12; G01S 5/0221; G01S 3/74
  (Continued)

(56) References Cited

U.S. PATENT DOCUMENTS 5,724,047 A   3/1998   Lioio et al.
5,999,129 A   12/1999   Rose
(Continued)

FOREIGN PATENT DOCUMENTS

EP   3128337 A1   8/2017
WO   2001/14902 A1   3/2001
(Continued)

OTHER PUBLICATIONS

Don J. Torrieri, "Statistical Theory of Passive Location Systems", Transactions on Aerospace and Electronic Systems vol. AES-20, No. 2 Mar. 1984.

*Primary Examiner* — Chuong P Nguyen
(74) *Attorney, Agent, or Firm* — Browdy and Neimark, PLLC

(57) ABSTRACT

A method of estimating the location of a signal source comprises, by a processing unit:
  determining $\Delta\Delta\varphi^{m,n}$ which represents a difference between accumulated phases of signals, $S_m$ and $S_n$, received by at least one pair of the receivers,
  determining a first estimate of the location of said signal source based on position data and $\Delta\Delta\varphi^{m,n}$ of said at least one pair of receivers, said first estimate being associated with an accuracy area,
  determining data representative of difference in times of arrival of modulation patterns of the signals $S_m$, $S_n$, wherein said data comprise an ambiguity, and
  for said at least one pair of receivers, using at least said data representative of difference in times of arrival of the modulation patterns of the signals, $\Delta\Delta\varphi^{m,n}$, and said accuracy area, to obtain second estimates $\hat{e}_{Src}^k$ of the source location, at least some of them being located within the accuracy area.

20 Claims, 9 Drawing Sheets

(51) Int. Cl.
*G01S 5/06* (2006.01)
*G01S 5/12* (2006.01)
*G01S 3/74* (2006.01)

(52) U.S. Cl.
CPC .............. *G01S 3/74* (2013.01); *G01S 5/0249* (2020.05); *G01S 5/12* (2013.01)

(58) Field of Classification Search
USPC .................................................. 342/350, 450
See application file for complete search history.

(56) References Cited

U.S. PATENT DOCUMENTS

| | | | |
|---|---|---|---|
| 6,018,312 A | 1/2000 | Haworth et al. | |
| 9,057,772 B1 | 6/2015 | Chavez et al. | |
| 9,063,215 B2* | 6/2015 | Perthold | G01S 5/021 |
| 9,841,489 B2* | 12/2017 | Boker | G01S 5/02213 |
| 10,107,892 B2* | 10/2018 | Fireaizen | H04W 56/001 |
| 10,935,668 B2* | 3/2021 | Clymer | G01S 5/0249 |
| 2003/0117319 A1 | 6/2003 | Rideout et al. | |
| 2009/0278733 A1 | 11/2009 | Haworth et al. | |
| 2013/0265198 A1* | 10/2013 | Stroud | G01S 5/02216 342/378 |
| 2017/0003376 A1 | 1/2017 | Broad et al. | |
| 2017/0205492 A1 | 7/2017 | Jacklin et al. | |
| 2017/0264472 A1 | 9/2017 | Dolgin | |
| 2018/0011162 A1 | 1/2018 | Bovard et al. | |
| 2019/0004140 A1 | 1/2019 | Le Meur | |
| 2019/0082302 A1* | 3/2019 | Swanson | H04B 1/3827 |
| 2020/0260306 A1 | 8/2020 | Kleinbeck et al. | |
| 2021/0373147 A1* | 12/2021 | Moon | G01S 13/534 |
| 2022/0069953 A1* | 3/2022 | Cho | G01S 5/0009 |

FOREIGN PATENT DOCUMENTS

| | | | |
|---|---|---|---|
| WO | 2011/160698 A1 | 12/2011 | |
| WO | WO-2011158233 A1 * | 12/2011 | ............... G01S 5/12 |
| WO | 2017/003529 A1 | 1/2017 | |

* cited by examiner

100

| 110 | Providing data indicative of a signal $S_n$ received by each of the at least two receivers $\{Rc_n\}$. |

| 120 | Applying a processing to each received signal $S_n$ to determine the phase $\Delta\varphi^n$ that is accumulated during certain time interval $\Delta t$ of the reception of the signal $S_n$ |

| 130 | Applying a processing to determine a differential phase $\Delta\Delta\varphi^{m,n}$ between the accumulated phases, $\Delta\varphi^m$ and $\Delta\varphi^n$, of the signals, $S_m$ and $S_n$, received by one or more pairs $\{m,n\}$ of the receivers $Rc_m$ and $Rc_n$ |

| 140 | Providing position data indicative of positions of the at least two receivers |

| 150 | Applying a processing to determine a first estimate of the location of the signal source based on the differential phase $\Delta\Delta\varphi^{m,n}$ and the respective positions of the receivers, said first estimate being associated with an accuracy area |

| 160 | Determining data representative of difference in times of arrival of the signals $S_m$, $S_n$ received by one or more pairs $\{m,n\}$ of receivers, said data being associated with an ambiguity |

| 170 | Using at least data representative of difference in times of arrival, $\Delta\Delta\varphi^{m,n}$ and the accuracy area to obtain one or more second estimates of the source locations, which comply with the accuracy area |

164 — Recording the times of arrival $\{TOA_{p_j}^{(n)}\}$ of at least one pulse $p_j^{(n)}$ at two or more of the receivers $\{Rc_n\}$

166 — Determining the differential time of arrival $\Delta t_{p_j}^{m,n} = t_{p_j}^m - t_{p_j}^n$ of the pulse $p_j^{(n)}$ to the receivers $Rc_m$ and $Rc_n$

167 — Determining data $\Delta \bar{t}_j^{m,n}$ representative of the differential times of arrival of the pulses at the pair of receivers over a given period of time, such as over one or more dwells

Fig. 2

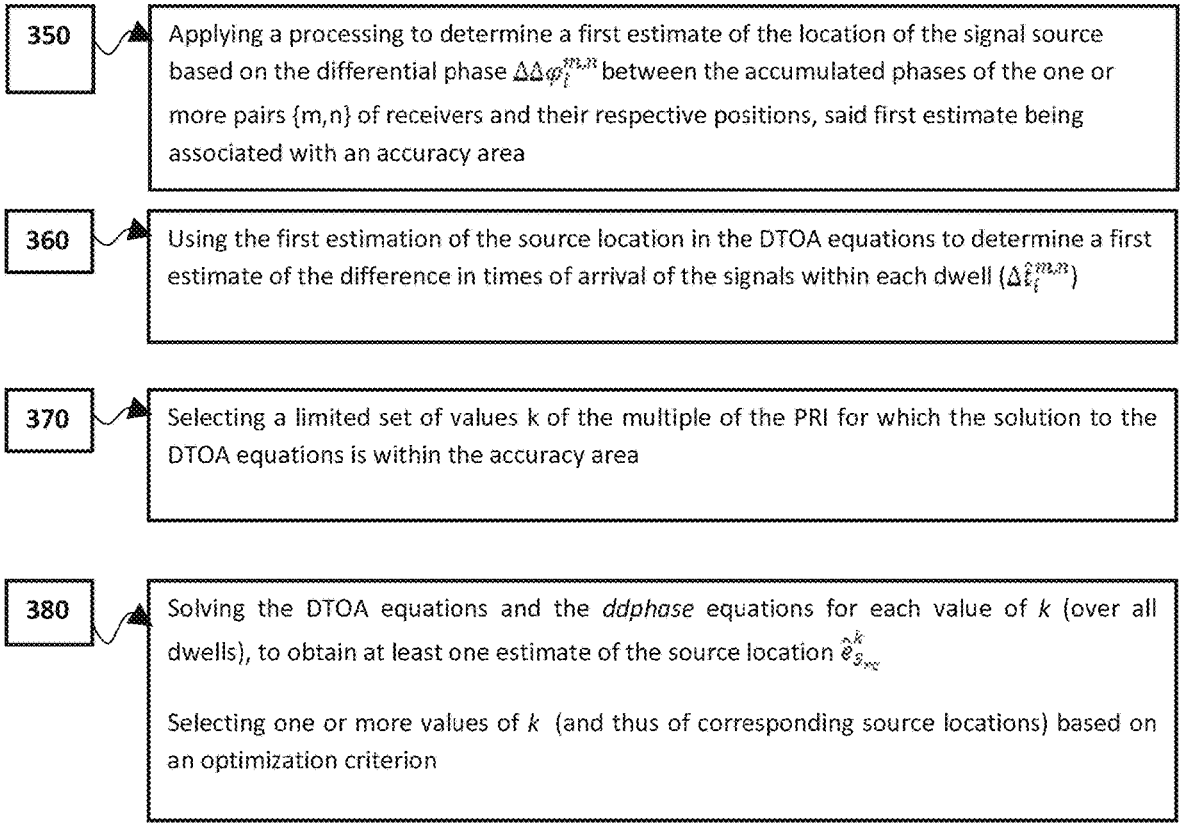

| 350 | Applying a processing to determine a first estimate of the location of the signal source based on the differential phase $\Delta\Delta\varphi_f^{m,n}$ between the accumulated phases of the one or more pairs {m,n} of receivers and their respective positions, said first estimate being associated with an accuracy area |
|---|---|
| 360 | Using the first estimation of the source location in the DTOA equations to determine a first estimate of the difference in times of arrival of the signals within each dwell ($\Delta\hat{t}_f^{m,n}$) |
| 370 | Selecting a limited set of values k of the multiple of the PRI for which the solution to the DTOA equations is within the accuracy area |
| 380 | Solving the DTOA equations and the *ddphase* equations for each value of k (over all dwells), to obtain at least one estimate of the source location $\hat{e}_{s_{xy}}^k$<br><br>Selecting one or more values of k (and thus of corresponding source locations) based on an optimization criterion |

Fig. 3

SYSTEMS AND METHODS FOR LOCATING A SIGNAL SOURCE

TECHNOLOGICAL FIELD

The invention is in the field of signal processing and relates to techniques for locating a source of a signal by a plurality of receivers.

BACKGROUND

Various techniques are known in the art for determining the location of a signal source by receiving and processing the signal emitted from the source by a plurality of signal receivers.

There is now a need to provide improved methods and systems for locating a signal source.

GENERAL DESCRIPTION

In accordance with certain aspects of the presently disclosed subject matter, there is provided a method of estimating the location of a signal source, the method comprising:

providing measured data indicative of a signal $S_n$ received from a signal source by each of a number of at least two receivers $\{Rc_n\}$ during time intervals $\{\Delta t_n\}$, where n is an index indicating the $n^{th}$ receiver $Rc_n$, and providing position data indicative of positions $\{R_n\}$ of said at least two receivers during said time intervals $\{\Delta t_n\}$ respectively;

applying a processing to determine differential phase differences $\Delta\Delta\varphi^{m,n}$ which represent a difference between accumulated phases, $\Delta\varphi^m$ and $\Delta\varphi^n$, of the signals, $S_m$ and $S_n$, received by at least one pair $\{m,n\}$ of the receivers, $Rc_m$ and $Rc_n$ during time intervals $\{\Delta t_n\}$, $\{\Delta t_m\}$, respectively;

applying a processing to determine a first estimate of the location of said signal source based on said position data and said differential phase differences $\{\Delta\Delta\varphi^{m,n}\}$ of said at least one pair $\{m,n\}$ of receivers, said first estimate being associated with an accuracy area;

applying a processing to determine data representative of difference in times of arrival of modulation patterns of the signals $S_m$, $S_n$ received by said at least one pair $\{m,n\}$ of receivers, wherein said data comprise an ambiguity; and for said at least one pair $\{m,n\}$ of receivers, using at least said data representative of difference in times of arrival of the modulation patterns of the signals, said differential phase differences $\Delta\Delta\varphi^{m,n}$, and said accuracy area, to obtain one or more second estimates $\hat{e}_{Src}^{k}$ of the source location, wherein at least some of these one or more second estimates $\hat{e}_{Src}^{k}$ of the source location are located within the accuracy area.

In addition to the above features, the method according to this aspect of the presently disclosed subject matter can optionally comprise one or more of features (i) to (xii) below, in any technically possible combination or permutation:

i. the method comprises using at least said accuracy area to obtain a limited set of values for said ambiguity;

ii. the method comprises solving equations relating differential phase differences $\Delta\Delta\varphi^{m,n}$ to the position data of said at least one pair $\{m,n\}$ of receivers and to the source location, and equations relating difference in times of arrival of modulation patterns of the signals $S_m$, $S_n$ to the position data of the receivers and to the source location, for one or more values of the ambiguity within said limited set, and providing said one or more second estimates $\hat{e}_{Src}^{k}$ of the source location based on said solving;

iii. the method comprises using the first estimate of the source location to obtain an estimate of the difference in times of arrival of the modulation patterns of the signals, and using said estimate of the difference in times of arrival of the modulation patterns of the signals, said limited set of values of said ambiguity and said differential phase differences $\Delta\Delta\varphi^{m,n}$ to provide said one or more second estimates $\hat{e}_{Src}^{k}$ of the source location;

iv. the method comprises using the first estimate $\hat{e}_{Src}^{k}$ of the source location to provide $\Delta\hat{t}^{m,n}$, wherein $\Delta\hat{t}^{m,n}$ is an estimate of data representative of difference in times of arrival of the modulation patterns of the signals;

v. the method comprises solving equations relating differential phase differences $\Delta\Delta\varphi^{m,n}$ to the position data of the receivers and to the source location, and equations relating $\Delta\hat{t}^{m,n}+k.PRI$ to the position data of the receivers and to the source location, and providing said one or more second estimates $\hat{e}_{Src}^{k}$ of the source location, wherein k is an integer selected such that said one or more second estimates $\hat{e}_{Src}^{k}$ are within said accuracy area;

vi. the method comprises obtaining a set of limited values for said ambiguity, said obtaining comprising selecting a plurality of multiples of a pulse repetition interval of the signals $S_m$, $S_n$, for which associated data representative of difference in times of arrival of modulation patterns of the signals provide an estimate of the location of the source which is within the accuracy area;

vii. the method comprises selecting an optimized set of values of said ambiguity according to an optimization criterion, said optimization criterion being representative of at least one of an error of a solution to equations relating differential phase differences $\Delta\Delta\varphi^{m,n}$ to the position data of the receivers and to the source location, and an error of a solution to equations relating difference in times of arrival of modulation patterns of the signals $S_m$, $S_n$ to the position data of the receivers and to the source location, and providing said one or more second estimates $\hat{e}_{Src}^{k}$ of the source location based on said optimized set of values;

viii. each of said signals $S_n$ has a constant pulse repetition interval (PRI), and $\|e-S_m\|-\|e-s_n\|\gg PRI.c$, wherein e is the location of the source, $s_m$ is the position of the receiver $Rc_m$ and $s_r$ is the position of the receiver $Rc_n$;

ix. signal $S_n$ has a PRF which is higher or equal to 100 KHz;

x. the method comprises providing measured data indicative of a signal $S_n$ received from a signal source by each of a number of at least two receivers $\{Rc_n\}$ during a time interval $\Delta t_i$ of a dwell i, where n is an index indicating the $n^{th}$ receiver $Rc_n$, and providing position data indicative of positions $\{R_n\}$ of said at least two receivers during said time interval $\Delta t_i$; applying a processing to determine differential phase differences $\Delta\Delta\varphi_i^{m,n}$ which represent a difference between accumulated phases, $\Delta\varphi_i^m$ and $\Delta\varphi_i^n$, of the signals, $S_m$ and $S_n$, received by at least one pair $\{m,n\}$ of the receivers, $Rc_m$ and $Rc_n$ during time interval $\Delta t_i$; applying a processing to determine a first estimate of the location of said signal source based on position data and said differential phase differences $\Delta\Delta\varphi_i^{m,n}$ of said at least one pair {m,n} of receivers, said first estimate being associated with an accuracy area, applying a processing to determine data representative of difference in times of arrival of modulation patterns of the signals $S_m$, $S_n$ received by said at least one pair {m,n} of receivers within said dwell, wherein said data comprise an ambiguity; for said at least one pair {m,n} of receivers, and for a plurality of said dwells, using at least said data representative of difference in times of arrival of the modulation patterns of the signals, said differential phase differences $\Delta\Delta\varphi_i^{m,n}$ and said accuracy area to obtain one or more second estimates $\hat{e}_{Src}^{k}$ of the source location, wherein at least some of these one or more second estimates $\hat{e}_{Src}^{k}$ of the source location are located within the accuracy area;

xi. each signal $S_n$ comprises a plurality of modulation patterns $p_{j,i}^{(n)}$ within dwell i, where n is an index indicating the $n^{th}$ receiver $Rc_n$, and j an index representing the $j^{th}$ modulation pattern, wherein said computing of $\Delta\Delta\varphi_i^{m,n}$ comprises computing $\Delta\varphi_{pj,i}^{m,n}$ which is representative of the phase difference between the phase of modulation pattern $p_{j,i}^{(n)}$ received at receiver $Rc_n$ and the phase of modulation pattern $p_{j,i}^{(m)}$ received at receiver $Rc_n$, the method comprising using a bound value which bounds the value of the difference between $\Delta\varphi_{pj,i}^{m,n}$ for two consecutive modulation patterns, to limit a phase ambiguity present in $\Delta\varphi_{pj,i}^{m,n}$;

xii. a dimension of the accuracy area has a length L, wherein said ambiguity is modelled as k.PRI, wherein PRI is the pulse repetition interval of signal Sn, and k is selected within a range which is between K1 and K2, wherein:

$$K_1 = \frac{\frac{-L}{2}}{PRI \cdot c} \text{ and } K_2 = \frac{\frac{+L}{2}}{PRI \cdot c}.$$

According to another aspect of the presently disclosed subject matter there is provided a non-transitory storage device readable by a machine, tangibly embodying a program of instructions executable by the machine to perform the above mentioned method. In addition, according to some embodiments, there is provided a non-transitory storage device readable by a machine, tangibly embodying a program of instructions executable by the machine to perform the above mentioned method which comprises one or more of features (i) to (xii).

According to another aspect of the presently disclosed subject matter there is provided a system for locating a signal source emitting a signal S, the system comprising one or more processing units configured to:

provide measured data indicative of a signal $S_n$ received from a signal source by each of a number of at least two receivers {$Rc_n$} during time intervals {$\Delta t_n$}, where n is an index indicating the $n^{th}$ receiver $Rc_n$, and providing position data indicative of positions {$R_n$} of said at least two receivers during said time intervals {$\Delta t_n$} respectively;

apply a processing to determine differential phase differences $\Delta\Delta\varphi^{m,n}$ which represent a difference between accumulated phases, $\Delta\varphi^m$ and $\Delta\varphi^n$, of the signals, $S_m$ and $S_n$, received by at least one pair {m,n} of the receivers, $Rc_m$ and $Rc_n$ during time intervals {$\Delta t_n$}, {$\Delta t_m$}, respectively;

apply a processing to determine a first estimate of the location of said signal source based on said position data and said differential phase differences {$\Delta\Delta\varphi^{m,n}$} of said at least one pair {m,n} of receivers, said first estimate being associated with an accuracy area;

apply a processing to determine data representative of difference in times of arrival of modulation patterns of the signals $S_m$, $S_n$ received by said at least one pair {m,n} of receivers, wherein said data comprise an ambiguity, and for said at least one pair {m,n} of receivers, use at least said data representative of difference in times of arrival of the modulation patterns of the signals, said differential phase differences $\Delta\Delta\varphi^{m,n}$, and said accuracy area to obtain one or more second estimates $\hat{e}_{Src}^{k}$ of the source location, wherein at least some of these one or more second estimates $\hat{e}_{Src}^{k}$ of the source location are located within the accuracy area.

In addition to the above features, the system according to this aspect of the presently disclosed subject matter can optionally comprise one or more of features (xii) to (xxiv) below, in any technically possible combination or permutation:

xiii. the system is configured to use at least said accuracy area to obtain a limited set of values for said ambiguity;

xiv. the system is configured to solve equations relating differential phase differences $\Delta\Delta\varphi^{m,n}$ to the position data of said at least one pair {m,n} of receivers and to the source location, and equations relating difference in times of arrival of modulation patterns of the signals $S_m$, $S_n$ to the position data of the receivers and to the source location, for one or more values of the ambiguity within said limited set, and provide said one or more second estimates $\hat{e}_{Src}^{k}$ of the source location based on said solving;

xv. the system is configured to use the first estimate of the source location to obtain an estimate of the difference in times of arrival of the modulation patterns of the signals, and use said estimate of the difference in times of arrival of the modulation patterns of the signals, said limited set of values of said ambiguity and said differential phase differences $\Delta\Delta\varphi^{m,n}$ to provide said one or more second estimates $\hat{e}_{Src}^{k}$ of the source location;

xvi. the system is configured to use the first estimate $\hat{e}_{Src}$ of the source location to provide $\Delta\hat{t}^{m,n}$, wherein $\Delta\hat{t}^{m,n}$ is an estimate of data representative of difference in times of arrival of the modulation patterns of the signals;

xvii. the system is configured to solve equations relating differential phase differences $\Delta\Delta\varphi^{m,n}$ to the position data of the receivers and to the source location, and equations relating $\Delta\hat{t}^{m,n}+k.PRI$ to the position data of the receivers and to the source location, and provide said one or more second estimates $\hat{e}_{Src}^{k}$ of the source location, wherein k is an integer selected such that said one or more second estimates $\hat{e}_{Src}^{k}$ are within said accuracy area;

xviii. the system is configured to obtain a set of limited values for said ambiguity, said obtaining comprising selecting a plurality of multiples of a pulse repetition interval of the signals $S_m$, $S_n$, for which associated data representative of difference in times of arrival of modulation patterns of the signals provide an estimate of the location of the source which is within the accuracy area;

xix. the system is configured to select an optimized set of values of said ambiguity according to an optimization criterion, said optimization criterion being representative of at least one of an error of a solution to equations relating differential phase differences $\Delta\Delta\varphi^{m,n}$ to the position data of the receivers and to the source location, and an error of a solution to equations relating difference in times of arrival of modulation patterns of the signals $S_m$, $S_n$ to the position data of the receivers and to the source location, and provide said one or more second estimates $\hat{e}_{Src}{}^k$ of the source location based on said optimized set of values;

xx. each of said signals $S_n$ has a constant pulse repetition interval (PRI), and $\|e-s_m\|-\|e-s_2\|>PRI.c$, wherein e is the location of the source, $s_m$, is the position of the receiver $Rc_m$ and $s_r$, is the position of the receiver $Rc_n$;

xxi. signal $S_n$ has a PRF which is higher or equal to 100 KHz;

xxii. the system is configured to provide measured data indicative of a signal $S_n$ received from a signal source by each of a number of at least two receivers $\{Rc_n\}$ during a time interval $\Delta t_i$ of a dwell i, where n is an index indicating the $n^{th}$ receiver $Rc_n$, and provide position data indicative of positions $\{R_n\}$ of said at least two receivers during said time interval $\Delta t_i$ apply a processing to determine differential phase differences $\Delta\Delta\varphi_i^{m,n}$ which represents a difference between accumulated phases, $\Delta\varphi_i^m$ and $\Delta\varphi_i^n$, of the signals, $S_m$ and $S_n$, received by at least one pair $\{m,n\}$ of the receivers, $Rc_m$ and $Rc_n$ during time interval $\Delta t_i$; apply a processing to determine a first estimate of the location of said signal source based on position data and said differential phase differences $\Delta\Delta\varphi_i^{m,n}$ of said at least one pair $\{m,n\}$ of receivers, said first estimate being associated with an accuracy area; apply a processing to determine data representative of difference in times of arrival of modulation patterns of the signals $S_m$, $S_n$ received by said at least one pair $\{m,n\}$ of receivers within said dwell, wherein said data comprise an ambiguity; for said at least one pair $\{m,n\}$ of receivers, and for a plurality of said dwells, using at least said data representative of difference in times of arrival of the modulation patterns of the signals, said differential phase differences $\Delta\Delta\varphi^{m,n}$, and said accuracy area to obtain one or more second estimates $\hat{e}_{Src}{}^k$ of the source location, wherein at least some of these one or more second estimates $\hat{e}_{Src}{}^k$ of the source location are located within the accuracy area;

xxiii. each signal $S_n$ comprises a plurality of modulation patterns $p_{j,i}^{(n)}$ within dwell i, where n is an index indicating the $n^{th}$ receiver $Rc_n$, and j an index representing the $j^{th}$ modulation pattern, wherein said computing of $\Delta\Delta\varphi_i^{m,n}$ comprises computing $\Delta\varphi_{pj,i}^{m,n}$ which is representative of the phase difference between the phase of modulation pattern $p_{j,i}^{(n)}$ received at receiver $Rc_n$ and the phase of modulation pattern $p_{j,i}^{(m)}$ received at receiver $Rc_m$, wherein the system is configured to use a bound value which bounds the value of the difference between $\Delta\varphi_{pj,i}^{m,n}$ for two consecutive modulation patterns, to limit a phase ambiguity present in $\Delta\varphi_{pj,i}^{m,n}$;

xxiv. a dimension of the accuracy area has a length L, said ambiguity is modelled as k. PRI, with PRI the pulse repetition interval of signal $S_n$, and k is selected within a range which is between $K_1$ and $K_2$, wherein:

$$K_1 = \frac{\frac{-L}{2}}{PRI \cdot c} \text{ and } K_2 = \frac{\frac{+L}{2}}{PRI \cdot c}$$

According to some embodiments, the proposed solution is able to determine the location of a source which emits a signal with a high PRF (pulse repetition frequency).

According to some embodiments, the proposed solution is able to determine the location of a source which emits a signal with a constant PRI (pulse repetition interval).

According to some embodiments, the proposed solution is able to determine the location of a source with signal receivers which are located "far" (definitions will be provided hereinafter in the specification) from each other relative to the source (and in particular at a distance which creates an ambiguity between the modulation patterns received at each signal receiver which needs to be reduced or solved for estimating the source location, this ambiguity being a multiple of the PRI).

According to some embodiments, the proposed solution is able to reduce an ambiguity present in the DTOA method (difference time of arrival).

According to some embodiments, the proposed solution provides an estimation of the source location which is more precise and more reliable.

According to some embodiments, the proposed solution provides rapidly an estimation of the source location which improves in time.

According to some embodiments, the proposed solution relies on the calculation of accumulated phases of the signals received at each receiver, wherein this calculation can be performed at each signal receiver. This provides a reduction of the data communication bandwidths and/or of the time required to transmit the data.

According to some embodiments, the proposed solution relies on various techniques to reduce the ambiguity which can arise in a method relying on differential phase measurements and/or in a method relying on DTOA.

According to some embodiments, the proposed solution obviates a need to monitor the trajectories of the signal receivers and their velocities along the trajectory, as would be required by techniques such as FDOA, since only data indicative of the positions of the receivers at two time points (e.g. at the beginning and the end of the time interval during which the phase is accumulated) is required to determine the location of the signal source (in addition to data representative of the signals received at each signal receiver).

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIGS. 1A to 1C are schematic illustrations exemplifying embodiments of systems and methods of locating a signal source; wherein FIG. 1A is a flow chart of an embodiment of a method for locating the signal source; FIG. 1B is a non-limitative graphical example of the method of FIG. 1A, and FIG. 1C is a block diagram of an embodiment of a system for locating the signal source;

FIG. 2 is representative of an embodiment of a method of determining data representative of the differential times of arrival of modulation patterns for at least one pair of receivers;

FIG. 3 is representative of an embodiment of a method of determining possible estimates of the source location;

DETAILED DESCRIPTION OF EMBODIMENTS

In the following detailed description, numerous specific details are set forth in order to provide a thorough understanding of the invention. However, it will be understood by those skilled in the art that the presently disclosed subject matter may be practiced without these specific details. In other instances, well-known methods have not been described in detail so as not to obscure the presently disclosed subject matter.

Unless specifically stated otherwise, as apparent from the following discussions, it is appreciated that throughout the specification discussions utilizing terms such as "processing", "applying", "determining", "using", "solving", "estimating", "reducing", "obtaining", "selecting", "computing" or the like, refer to the action(s) and/or process(es) of a processing unit that manipulates and/or transforms data into other data, said data represented as physical, such as electronic, quantities and/or said data representing the physical objects.

The term "processing unit" as disclosed herein should be broadly construed to include any kind of electronic device with data processing circuitry, which includes for example a computer processing device operatively connected to a computer memory (e.g. digital signal processor (DSP), a microcontroller, a field programmable gate array (FPGA), and an application specific integrated circuit (ASIC), etc.) capable of executing various data processing operations.

It can encompass a single processor or multiple processors, which may be located in the same geographical zone or may, at least partially, be located in different zones and may be able to communicate together.

The term "non-transitory memory" as used herein should be expansively construed to cover any volatile or non-volatile computer memory suitable to the presently disclosed subject matter.

Embodiments of the presently disclosed subject matter are not described with reference to any particular programming language. It will be appreciated that a variety of programming languages may be used to implement the teachings of the presently disclosed subject matter as described herein.

The invention contemplates a computer program being readable by a computer for executing one or more methods of the invention. The invention further contemplates a machine-readable memory tangibly embodying a program of instructions executable by the machine for executing one or more methods of the invention.

Figure 1B:
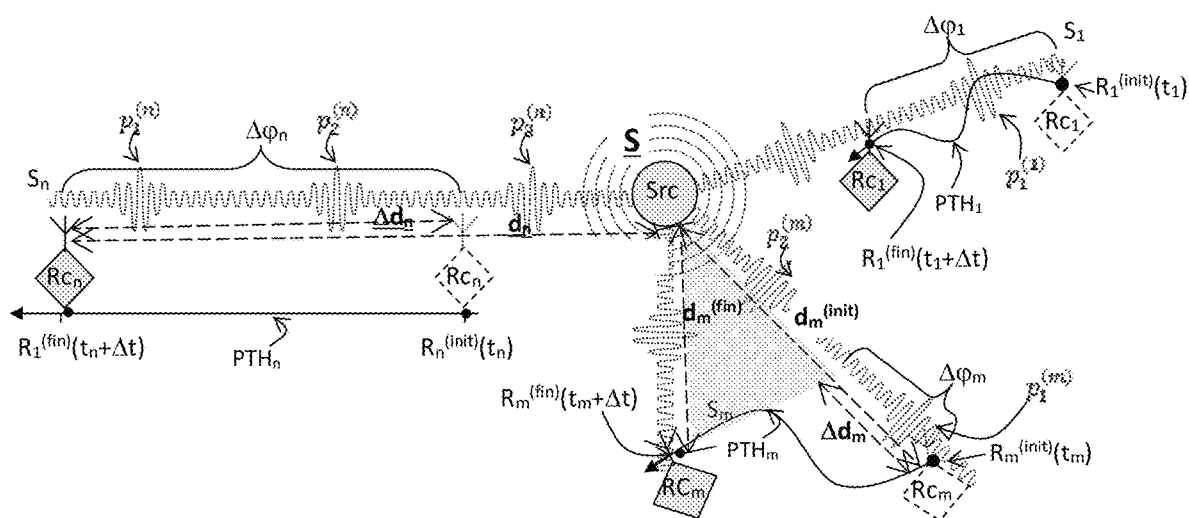
Figure 1C:
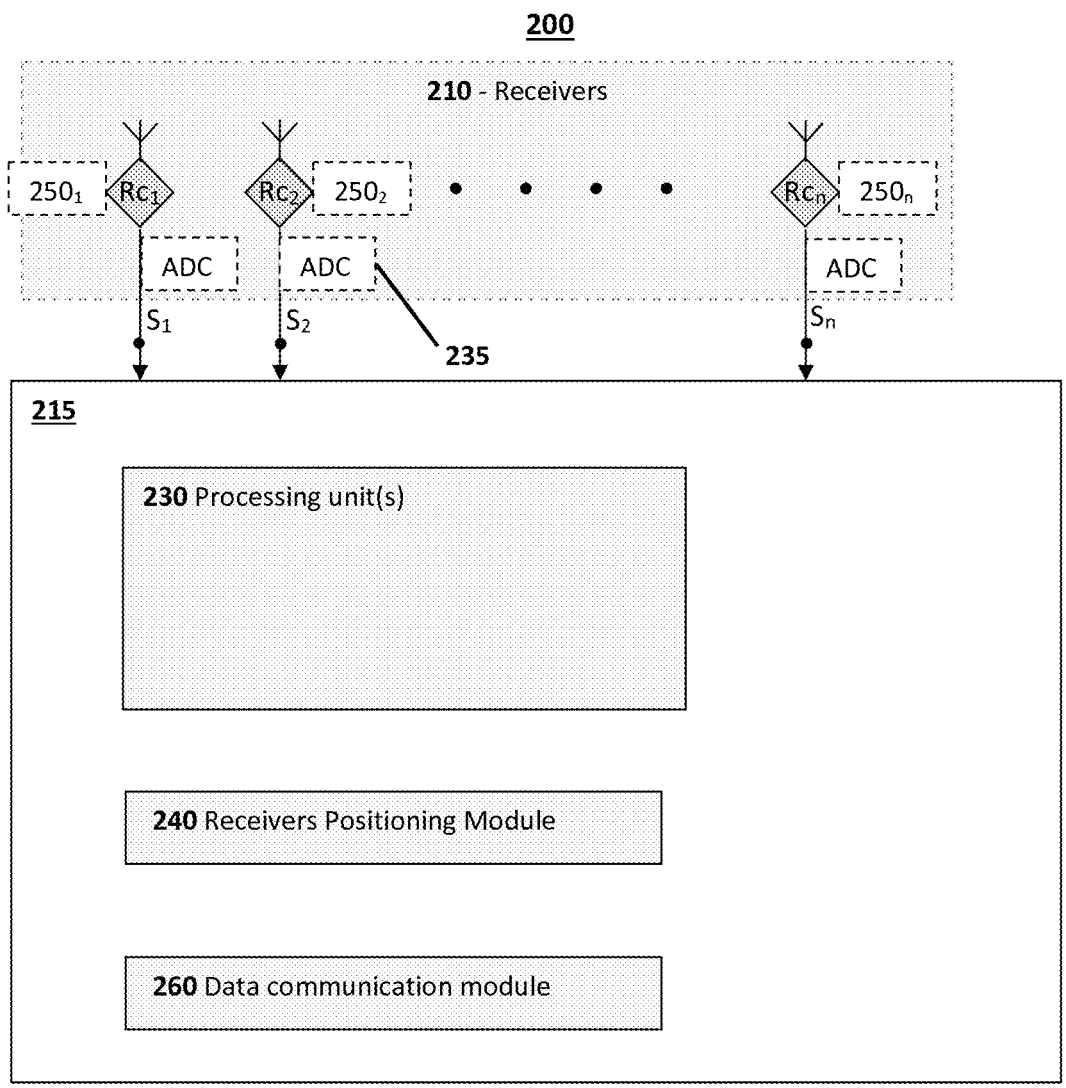

Reference is made together to FIGS. 1A, 1B and 1C exemplifying possible embodiments for locating a signal source Src.

FIG. 1A is a flow chart of a method 100 of locating the signal source Src according to some embodiments of the present invention. FIG. 1B is a schematic illustration of the operation of several receivers $Rc_1$-$Rc_n$ for locating the signal source Src according to the method depicted in FIG. 1A, and FIG. 1C is a block diagram of a system 200 configured according to certain embodiments for carrying out one or more methods described hereinafter (for example, carrying out the operations of method 100) for locating the signal source Src.

It should be noted that the operations 105-170 may be performed in a centralized manner (e.g. in a central processing utility) or, according to some embodiments, certain of these operations, such as operation 110 and/or operation 120, may be performed by one or more processing units associated with (e.g. integrated-/connected- with and/or adjacent to) respective ones of the receivers $Rc_1$-$Rc_n$ while other operations such as 130-170 which concern data about the signals from several receivers, may be centralized and performed by a central processing utility (which comprises one or more processing units) and/or distributed among several such utilities. The latter case provides for reducing the amount of information that needs to be transmitted from the receivers to the centralized/distributed processing utility(ies). To this end, the system 200 may be a centralized and/or distributed system.

FIG. 1C depicts functional modules/components that can be part of the system 200. The system 200 is connectable to, and optionally includes, signal receivers 210, including a plurality of receivers $Rc_1$-$Rc_n$ capable of detecting an electro-magnetic signal S (e.g. radio-frequency (RF) signals) emitted from a signal source Src which is to be located. The signal receivers 210 generate respective signals/data $S_1$-$S_n$ indicative of the emitted portion of the signal S respectively received thereby. The system 200 includes signal processing system 215 connectable to the receivers $Rc_1$-$Rc_n$ for obtaining and processing the signals/data $S_1$-$S_n$ received thereby during certain respective time intervals $\Delta t_1$-$\Delta t_n$, and is configured and operable to process the signals/data $S_1$-$S_n$ utilizing position data PD indicative of the positions $R_1$-$R_n$ and/or indicative of the change in the positions of the receivers at the respective time intervals $\Delta t_1$-$\Delta t_n$ and thereby estimate the location $R_{Src}$ of the signal source Src.

It should be noted that herein and in the following, except where explicitly denoted otherwise, the subscript indices n, m denote the index of the receivers $Rc_1$-$Rc_n$. Also, pairs of such subscript indices (e.g. m,n or mn) denote processing parameters/properties associated with the pair m,n of such receivers. Also it should be understood that notation of the curly brackets enclosing certain an element/parameter denoted with the sub-index (e.g. $\{Rc_n\}$) are used herein to indicate a group/collection of such elements/parameters (e.g. the notation may designate a group including several or all of the receivers $Rc_1$-$Rc_n$).

According to some embodiments, at least some of the plurality of receivers $Rc_1$-$Rc_n$ are carried by separate/different vehicular platforms (e.g. terrestrial vehicles, and/or space vehicles, such as satellites, and/or airborne vehicles, and/or marine vehicles), and at least some of which are in motion during the operation of the system 200 for locating the signal source Src. To this end, the plurality of receivers $Rc_1$-$Rc_n$ includes at least two receivers. According to some embodiments, three or more receivers are capable of detecting the signal S emitted from the signal source Src (which is to be located) can be used. This is however not mandatory.

The signal processing system 215 can include one or more processing unit(s) 230. As explained later in the specification, this processing unit 230 can perform various operations and processing of the signals that can be used for estimating the location of the signal source Src. According to some embodiments, one or more processing units 230 can be located at a central processing utility (located e.g. on the ground), and one or more processing units 230 can be located at other locations, such as at each receiver $\{Rc_n\}$, or on the platform on which each receiver $\{Rc_n\}$ is located, or adjacent to each receiver $\{Rc_n\}$.

As indicated above, in certain implementations the signal processing system 215 is implemented as a distributed system. For example certain stages of the processing are applied to each of the signals $\{S_n\}$ received by the receivers $\{Rc_n\}$, by utilizing suitable processing units of the processing system 215 located adjacent to the respective receivers $\{Rc_n\}$ (e.g. at their vehicular platforms).

As will be readily appreciated by those versed in the art, there are various possible techniques for implementing the signal processing system 215. According to some embodiments, one or more components of the signal processing system 215 can be implemented by utilizing analogue signal processing means/circuits, and/or utilizing digital/computerized processing systems and/or by a combination of analogue and digital signal processing means/circuits. Components of the system which are implemented digitally may include or be associated with one or more digital processors, such as CPUs and/or DSPs for processing signals received, and with suitable samplers and/or analogue to digital converters (ADCs) for sampling the signals from the receivers and converting them to digital representation and/or possibly also with digital to analogue converters for converting digital signals to analogue forms in case the signals are processed by a combination of analogue and digital means.

As will be appreciated by those versed in the art, in case the system is implemented with analogue means, analogue circuits for implementing the operations described by method 100 may for example include a proper arrangement of signal amplifiers and signal frequency filters (e.g. bandpass filters) applying suitable amplification and/or filtering to the received signal to obtain desired frequency band thereof, signal mixers (e.g. homodyne/heterodyne) and possibly also local oscillators arranged to allow extraction of the phase of the signal, integrators and/or comparators configured and operable for generating signals indicative of the accumulated phase, and/or of the differential phase between the receivers. To this end, although the signal processing system 215 may be implemented by analogue means, in some embodiments it may be implemented in a more versatile manner by utilizing digital processing techniques.

For instance, in certain specific embodiments of the present invention, the receivers $\{Rc_n\}$, which may comprise for example antenna(s), generate an analogue signal corresponding to the signal $\{S_n\}$, respectively received thereby from the signal source Src. The receivers $\{Rc_n\}$ can be associated with respective ADCs 235 converting analogue signals from the receivers into digital representations $\{S_n\}$, which are then fed to the signal processing system 215.

The process of locating the signal source Src can involve processing together of certain properties of the signals from at least two of the receivers $\{Rc_n\}$. To this end, the vehicular platforms carrying the receivers, or some of them, may also carry respective data communication modules $250_1, \ldots, 250_n$ (such as, but not limited to, antenna(s), etc.) for communicating data indicative of certain properties of the signals $\{S_n\}$ to the signal processing system 215. The latter may also include a data communication module 260 (such as, but not limited to, antenna(s), etc.) for receiving the communicated data.

According to some embodiments, the signal processing system 215 also includes, or is in communication with, receivers' positioning module 240 operable to provide position data PD indicative of positions of the receivers $\{Rc_n\}$ during respective time intervals $\{\Delta t_n\}$. For each receiver $Rc_n$, the position data PD may indicate its position (such as 2D or 3D position, noted "$R_n$") at two time points within respective time interval $\Delta t_n$ (which lasts from $t_n^{init}$ to $t_n^{fin}$).

For example, position data PD can include $R_n(t_n^{init})$ and $R_n(t_n^{fin})$. In other examples, PD can include at least a first/initial and second/final time points within the time interval $\Delta t_n$.

Alternatively, or equivalently, position data PD may be indicative of the position $R_n$ of the receiver $Rc_n$ at one of the time points (e.g. $R_n(t_n^{init})$ or $R_n(t_n^{fin})$) and the change in that position $\Delta R_n$ during the time interval $\Delta t_n$ between $t_n^{init}$ and $t_n^{fin}$.

As indicated above and shown in FIG. 1B, receivers $Rc_1$-$Rc_n$, or at least some of them, are carried and moved by vehicular platforms (not specifically shown) along respective paths $PTH_1$-$PTH_n$, which may be for example curved and/or straight paths. To this end, the receivers' positioning module 240 may include and/or be in communication with any suitable positioning system(s), such as GPS systems installed on the vehicular platforms and/or radar system tracking the vehicular platforms upon which the receivers $\{Rc_n\}$ are installed, which can monitor the positions and/or motions of the respective vehicular platforms.

In this regard, as will be appreciated by those versed in the art, the receivers' positioning module 240 can include data communication capable of communication with positioning and/or tracking systems that are capable of tracking/monitoring/obtaining the positions of the receivers $\{Rc_n\}$ (there are various known in the art types of such positioning/tracking systems which can be used in the present invention to obtain positions of the signal receivers). As indicated above, according to some embodiments, some of the receivers $\{Rc_n\}$, although not all of them, may be stationary (not moving) receivers. In this case, the static predetermined positions of the stationary receivers may be stored in a local and/or remote non-transitory memory and can be retrieved by the receivers' positioning module 240 directly and/or via the data communication.

Further details on an embodiment of a method of estimating the location (noted $e_{Src}$) of the signal source Src will now be described with reference to method 100 of FIG. 1A and to the schematic illustration on FIG. 1B. Certain of the modules of system 200 may be configured and operable to perform the respective method operations.

In operation 105 of method 100, at least two signal receivers $\{Rc_n\}$ capable of detecting a signal S emitted from the signal source Src that should be located, are provided. The receivers $\{Rc_n\}$ are mounted on respective moving platforms, which carry them along respective paths (curved or straight paths) $PTH_1$-$PTH_n$.

In FIG. 1B, three receivers $Rc_1$, $Rc_m$ and $Rc_n$ are explicitly depicted and shown for example to be respectively moving along: curved path $PTH_1$ in the general radial direction to the signal source Src, curved path $PTH_n$ in an arbitrary general direction with respect to the signal source Src, and straight path $PTH_n$ in the radial direction to the signal source Src.

The signal S emitted from the source Src during the movement of the receivers is illustrated schematically in FIG. 1B by the concentric circles depicting the equi-potential lines of the waveform of the signal S at a certain instant. The specific portions $S_1$, $S_m$ and $S_n$ of the signal S received by the receivers $Rc_1$, $Rc_m$ and $Rc_n$ during their movement along the paths $PTH_1$, $PTH_m$ and $PTH_n$ are also illustrated schematically.

Signal S comprises one or more sections. As a consequence, each signal $\{S_n\}$ received by each receiver $\{Rc_n\}$ comprises one or more of these sections. These sections can include certain modulation patterns applied to the carrier wave of the signal. According to some embodiments, the signal S may be modulated by modulation patterns formed according to various techniques, such as Amplitude Modulation (AM), Frequency Modulation (FM) (e.g. regular FM or linear FM) or any other modulation technique (e.g. Phase Modulation).

FIG. 1B shows schematically several sections ("modulation patterns") of each signal $\{S_n\}$ received by each receiver $\{Rc_n\}$, referenced $p_1^{(n)}$, $p_2^{(n)}$, and $p_3^{(n)}$, etc.

Each section or modulation pattern can be generally noted as $p_j^{(n)}$, or $p_{j,i}^{(n)}$, wherein "j" is the number of the received modulation pattern, "(n)" refers to receiver $Rc_n$ and "i" refers to the number of the dwell, as explained later in the specification.

In the following, these sections are generally considered in the form of pulses, but this is not mandatory.

Although signal S comprises various pulses which are detected by the receivers $\{Rc_n\}$, an ambiguity can arise from the fact that it is not necessarily known if the $j^{th}$ pulse $p_j^{(n)}$ received by receiver $Rc_n$ corresponds to the $i^{th}$ pulse $p_j^{(m)}$ received by receiver $Rc_m$ or to another pulse, such as the $i^{th}$ pulse $p_i^{(m)}$ received by receiver $Rc_m$, with i≠j.

This ambiguity can result from the fact that signal S has a constant pulse repetition interval (PRI). As a consequence, signals $\{S_n\}$ can also have a constant PRI, which may introduce an ambiguity in the identification of the pulses between the different receivers $\{Rc_n\}$.

In addition, this ambiguity can also result from the fact that the PRI of signal S is low, and thus that the PRF of signal S is high. For example, the PRF can be more than 100 KHz, or equal to this value, this value being not limitative.

In addition, this ambiguity can also result from the fact that the receivers $\{Rc_n\}$ are far from each other relative to the source Src. This can be reflected by the following equation, for each couple of receivers $Rc_m$, $Rc_n$:

$$\|e_{Src}-R_m\|-\|e_{Src}-R_n\| >> PRI.c \quad \text{Equation 1}$$

In Equation 1, $R_m$ and $R_n$ are the respective positions of receivers $Rc_m$ and $Rc_n$, $e_{Src}$ is the position of source Src, PRI is the pulse repetition interval of signal S, and c is the velocity of light.

As shown in FIG. 1A, method 100 can include operation 110 which includes providing data indicative of the signals ($\{S_n\}$), which are received (and possibly sampled) by at least two receivers.

This can comprise providing data indicative of the signals $S_m$ and $S_n$ which are received (and possibly sampled) by receivers $Rc_m$ and $Rc_n$ (generally referred to as $\{Rc_n\}$) during their movement along their respective paths (according to some embodiments, one of the receivers may also be stationary). The provided data of the signals $S_m$ and $S_n$ may include only the part of those signals received by those receivers $\{Rc_n\}$ during respective time intervals $\{\Delta t_n\}$ during which the receivers move in between respective first positions $\{R_n^{init}\}$ to second positions $\{R_n^{(fin)}\}$ along their respective paths $\{PTH_n\}$. For example, in FIG. 1B, the signals $S_1$, $S_m$ and $S_n$ are provided, while the respective receivers $Rc_1$, $Rc_m$ and $Rc_n$ move from their first positions $R_1^{(init)}(t_1)$, $R_m^{(init)}(t_m)$, and $R_n^{(init)}(t_n)$ at initial times $t_1$, $t_m$ and $t_n$, to second positions $R_1^{(fin)}(t_1+\Delta t)$, $R_m^{(fin)}(t_m+\Delta t)$ and $R_n^{(fin)}(t_n+\Delta t)$ at the final times $t_1+\Delta t$, $t_m+\Delta t$ and $t_n+\Delta t$. Here the time intervals $\{\Delta t_n\}$, for which the signals $S_1$, $S_m$ and $S_n$ are provided, correspond to respectively $\{\Delta t_n=[t_n, t_n+\Delta_t]\}$ (i.e. $\Delta t_1=[t_1, t_1+\Delta t]$, $\Delta t_m=[t_m, t_m+\Delta t]$, and $\Delta t_n=[t_n, t_n+\Delta t]$). According to some embodiments, method 100 can be operated to estimate the location of the signal source by processing the signals received from the different receivers $\{Rc_n\}$ at different times $\{t_n\}$ (e.g. it may be that $t_1 \neq t_m \neq t_n$).

According to some embodiments, the signals $\{S_n\}$, which are processed to determine the location of the signal source Src, are signals that were received by the receivers at time intervals $\{\Delta t_n\}$ of equal duration (the duration is indicated by $\Delta t$).

This can be useful for reducing certain ambiguities, which may arise when computing the accumulated phases $\{\Delta \varphi^n\}$ of the signals $\{S_n\}$ (e.g. during unwrapping/unfolding procedures described hereinafter).

The method 100 can further comprise applying a processing 130 to determine differential phase differences $\Delta\Delta\varphi^{m,n}$ ($\Delta\Delta\varphi^{m,n}=\Delta\varphi^m-\Delta\varphi^n$) which represent a difference between accumulated phases, $\Delta\varphi^m$ and $\Delta\varphi^n$, of the signals $S_m$ and $S_n$, received by one or more pairs $\{m,n\}$ of the receivers, $Rc_m$ and $Rc_n$ during time intervals $\{\Delta t_m\}$, $\{\Delta t_n\}$, respectively.

Accumulated phases $\Delta\varphi^m$ and $\Delta\varphi^n$ can be determined in operation 120, which comprises applying a processing to each signal $\{S_n\}$ to determine the phase $\{\Delta\varphi^n\}$ that is accumulated during its respective time interval $\Delta t_n$. According to some embodiments, and as described in the embodiment of FIG. 4 (see Equation 23), $\Delta\Delta\varphi^{m,n}$ can be computed without calculating explicitly $\Delta\varphi^m$ and $\Delta\varphi^n$, by computing the difference between:
- the difference in phase between the last pulse received by receiver $Rc_m$ and the last pulse received by receiver $Rc_n$, and
- the difference in phase between the first pulse received by receiver $Rc_m$ and the first pulse received by receiver $Rc_n$.

As shown in FIG. 1B, during the reception of each signal $S_n$, its respective receiver $Rc_n$ may move from an initial position $R_n^{(init)}(t_n)$ at initial time $t_n$, to final position $R_n^{(fin)}(t_n+\Delta t)$ at final time $t_n+\Delta t$ within the time interval $\Delta t_n$. The accumulated phase $\Delta\varphi^n$ in the received signal during that time interval can therefore be attributed to:

(1) change in the phase of the signal during the time duration (e.g. $\Delta t$) of the time interval $\Delta t_n$; and (2) the change in position $R_n$ of the respective receiver $Rc_n$ in between first/initial and second/final times $t_n^{(init)}$ and $t_n^{(fin)}$ in the time interval $\Delta t_n$, and more specifically the change $\Delta d_n$ of its distance $d_n$ from the signal source Src during that time interval, as depicted in the figure. More specifically the change $\Delta d_n$ of the distance $d_n$ of the $n^{th}$ receiver is given by:

$$\Delta d_n = d_n(t_n^{fin}) - d_n(t_n^{init}) = \|R_n(t_n^{fin}) - e_{Src}(t_n^{fin})\| - \|R_n(t_n^{init}) - e_{Src}(t_n^{init})\| \quad \text{Equation 2}$$

To this end the accumulated change $\Delta\varphi^n$ in the phase of the signal $S_n$ received during the time interval $\Delta t_n$ by receiver $Rc_n$ is given by:

$$\Delta\varphi^n = 2\pi f \Delta t + 2\pi \Delta d_n / \lambda \quad \text{Equation 3}$$

where f is the frequency (e.g. carrier frequency) of the signal S emitted from the signal source Src, $\Delta t$ is the duration of the time interval $\Delta t_n$, $\lambda$ is the wavelength of the signal S given by $\lambda = c/f$ (where c being the speed of light), and $\Delta d_n$ is the change in the distance $d_n$ of the $n^{th}$ receiver from the source Src during the time interval as given by Equation 2.

By inverting Equation 3, the change in the distance $\Delta d_n$ to the source Src can be expressed in terms of the accumulated phase $\Delta \varphi^n$ as follows: $\Delta d_n = (c/2\pi f)\Delta \varphi^n - c \cdot \Delta t$. By combining this with Equation 2 above, a relation between the accumulated phase $\Delta \varphi^n$ and the positions $R_n$ and $e_{Src}$ of the receiver $Rc_n$ and the signal source Src can be obtained as follows:

$$\|R_n(t_n^{fin}) - e_{Src}(t_n^{fin})\| - \|R_n(t_n^{init}) - e_{Src}((t_n^{init})\| = (c/2\pi f)\Delta \varphi^n - c \cdot \Delta t \quad \text{Equation 4}$$

where the time interval $\Delta t_n$ during which the phase is accumulated is given by:

$$\Delta t_n = [t_n^{init}, t_n^{fin}n] = [t_n^{init}, t_n^{init} + \Delta t]$$

It is noted that the location of the signal source Src cannot be generally resolved from Equation 4 directly, because of the large ambiguity which may be included in the value of the accumulated phase $\Delta \varphi^n$. Further processing described hereinafter will help to reduce/cancel this ambiguity.

Operation 130 provides a determination of differential phase $\Delta\Delta\varphi^{m,n}$ between the accumulated phases, $\Delta\varphi^n$ and $\Delta\varphi^m$, of the signals, $S_m$ and $S_n$, received by at least this pair {m,n} of the receivers $Rc_m$ and $Rc_n$. According to some embodiments, these operations can be applied to a plurality of different pairs {m,n} of the receivers. As explained later in the specification, according to some embodiments, the differential phase $\Delta\Delta\varphi^{m,n}$ is computed for each dwell i, and is thus noted $\Delta\Delta\varphi_i^{m,n}$.

For each pair {m,n} of receivers, the differential phase $\Delta\Delta\varphi^{m,n}$ can be determined as follows:

$$\Delta\Delta\varphi_p^{m,n} = \Delta\varphi^m - \Delta\varphi^n \quad \text{Equation 5}$$

And more specifically by substituting Equation 3 into Equation 5:

$$\Delta\Delta\varphi^{m,n} = 2\pi/\lambda(\Delta d_m - \Delta d_n) + 2\pi f(|\Delta t_m| - |\Delta t_n|). \quad \text{Equation 6}$$

According to some embodiments, the time intervals $\Delta t_m$ and $\Delta t_n$ of each pair {m,n} of the receivers for which the differential phase is calculated are of equal durations, namely $|\Delta t_m| = |\Delta t_n| = \Delta t$.

Accordingly, the second term in Equation 6 is nullified and the following relation is obtained for each pair {m,n} of receivers for which the differential phase is computed in 130:

$$\Delta\Delta\varphi^{m,n} = 2\pi/\lambda(\Delta d_m - \Delta d_n). \quad \text{Equation 7}$$

Substituting Equation 2 into Equation 7, the differential phase $\Delta\Delta\varphi^{m,n}$ is obtained in terms of the positions of the pair {m,n} of receivers, $Rc_m$ and $Rc_n$, and the position of the source Src at initial and final times $t_m^{init}$, $t_m^{fin}$ and $t_n^{init}$, $t_n^{fin}$ in the respective time intervals, $\Delta t_m$ and $\Delta t_n$.

$$\Delta\Delta\varphi^{m,n} = 2\pi/\lambda[(\|R_m(t_m^{fin}) - e_{Src}\| - \|R_m(t_m^{init}) - e_{Src}\|) - (\|R_n(t_n^{fin}) - e_{Src}\| - \|R_n(t_n^{init}) - e_{Src}\|)], \quad \text{Equation 8}$$

wherein $e_{Src}$ is the position of the source $S_{rc}$.

The method 100 can include operation 140 in which position data PD are provided (e.g. obtained from positioning modules 240 which are associated with the receivers, and/or which are monitoring their respective positions). As indicated above, position data PD can include data indicative of position of each receiver $Rc_n$ in at least two, initial and final, time points, $t_n^{init}$ and $t_n^{fin}$, within the respective time interval $\Delta t_n$ of the receiver; namely providing $R_n(t_n^{init})$ and $R_n(t_n^{fin})$. This is equivalently indicative of the position $R_n$ of the receiver $Rc_n$ at one of the time points (e.g. $R_n(t_n^{init})$) and the change in that position $\Delta R_n$ during the time interval $\Delta t_n$.

In view of the above, the only remaining unknown variable left in Equation 8 is related to the location of the signal source: $e_{Src}$.

In operation 150, a processing can be applied to determine a first estimate $\hat{e}_{Src}$ of the location of the signal source based on the differential phase $\Delta\Delta\varphi^{m,n}$ obtained for at least one pair {m,n} of the receivers in operation 130.

This can be achieved by solving Equation 8 (also called "ddphase" equation) above for at least one pair {m,n} of the receivers {$Rc_n$} while utilizing the positions {$R_n$} of the receivers {$Rc_n$} at their respective time intervals as obtained in operation 140 and also utilizing the differential phases $\Delta\Delta\varphi^{m,n}$ for different pairs of receivers obtained in operation 130.

As explained later in the specification, in some embodiments, the method is applied to a plurality of dwells (which corresponds to a period of time comprising a plurality of modulation patterns), and thus, if N dwells are present, N equations (N times Equation 8, one for each dwell) can be solved.

It should be noted that according to some embodiments, signal source Src is assumed and/or is known to be stationary. In this case, the velocity $V_{Src}$ of the signal source needs not to be determined and/or it is assumed zero $V_{Src}=0$. In such cases the only unknown variable that needs to be determined by the set of Equation 8 is the stationary vector location of the signal source Src.

According to some embodiments, in operation 150 a set of at least V linearly independent equations similar to Equation 8 obtained for at least V independent pairs {m,n} of the receivers {$Rc_n$} are processed/computed and solved to determine the location $e_{Src}$ of the signal source Src.

The first estimation of the source location can be provided with an accuracy area (also called accuracy ellipse, this shape being not limitative) which is the 2D or 3D area (around the estimated position $\hat{e}_{Src}$) in which it is assessed that the signal source can be located, based on the results of the "ddphase" equation (operation 150).

The accuracy area can be computed using mathematical tools, which can rely notably on the position data of the receivers, the estimated position of the signal source, and given standard deviations of the errors of parameters/measurements present in the equations.

For example, a covariance matrix of the errors of the parameters/measurements present in the equations can be computed, and the accuracy area can be computed based on this covariance matrix and the estimated position of the signal source. These parameters include e.g. position data of the receivers, velocity data of the receivers, the time of arrival of the modulation patterns of the signals, the phase measurements, and if applicable a first estimation of the altitude of the signal source (in some cases a digital model of the terrain "DTM" can be used to assess the altitude of the signal source).

A non-limitative example of a method of computing an accuracy ellipse is provided in *Statistical Theory of Passive Location Systems*, Don J. Torrieri, 1984, which is incorporated herein by reference. It is to be understood that other methods can be used for computing the accuracy area, using any appropriate mathematical tools.

Figure 1D:
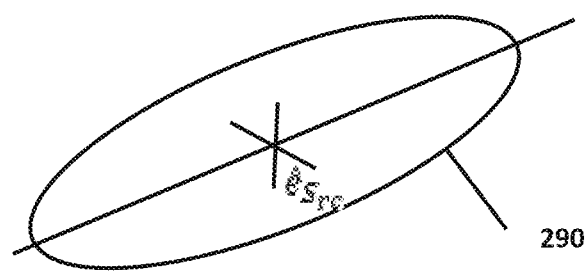
FIG. 1D is representative of a first estimate of the source location, associated with an accuracy area, using "ddphase" (differential phase differences) equations.

A non-limitative example is illustrated in FIG. 1D, in which an accuracy ellipse 290 is drawn around the estimated location $\hat{e}_{Src}$.

The method 100 can further comprise operation 160 comprising determining data representative of difference in times of arrival $\Delta t^{m,n}$ of the signals $S_m$, $S_n$ received by one or more pairs {m,n} of receivers. More particularly, these data can be representative of difference in times of arrival of sections ("modulation patterns") of the signals $S_m$, $S_n$. Specific embodiments for performing operation 160 will be described with reference to FIGS. 2 and 3.

Difference in times of arrival of modulation pattern $p_j^{(m)}$, received at receiver $Rc_m$, and modulation pattern $p_j^{(n)}$, received at receiver $Rc_n$ (noted $\Delta_{pj}^{m,n}$), depends on the difference (divided by the speed of light c) between:
- the distance between the source Src and the first receiver $Rc_m$, and
- the distance between the source Src and the second receiver $Rc_n$.

This can be expressed, for a modulation pattern $p_j$, by the general equation:

$$\Delta t_{pj}^{m,n} = (1/c)[\|R_m(TOA_{pj}^{(m)} - e_{Src})\| - \|R_n(TOA_{pj}^{(n)}) - e_{Src}\|], \quad \text{Equation 9}$$

wherein $TOA_{pj}^{(m)}$ is the time of arrival of modulation pattern $p_j^{(m)}$ at receiver $Rc_m$ and $TOA_{pj}^{(n)}$ is the time of arrival of modulation pattern $p_j^{(n)}$ at receiver $Rc_n$.

As explained later in the specification, this equation can be applied for each of a plurality of dwells.

According to some embodiments, a value representative of the difference in time of arrival of the modulation patterns can be computed over a given period of time (noted $\Delta \bar{t}^{m,n}$ or over a dwell (noted $\Delta \bar{t}_i^{m,n}$, for dwell i). This value can be e.g. an average of the value $\Delta t_{pj}^{m,n}$ for all pulses $p_j$ within this given period of time or within this dwell.

As already mentioned above, an ambiguity is present in data $\Delta t_{pj}^{m,n}$ (and equivalently in $\Delta \bar{t}^{m,n}$ and $\Delta \bar{t}_i^{m,n}$) due in particular to the fact that it is not known in advance if the $j^{th}$ modulation pattern $p_j^{(n)}$ received by receiver $Rc_n$ corresponds to the $j^{th}$ modulation pattern $p_j^{(m)}$ received by receiver $Rc_m$ or to another modulation pattern, such as the $i^{th}$ modulation pattern $p_i^{(m)}$ received by receiver $Rc_m$, with i≠j.

This ambiguity is generally expressed as a multiple of the PRI of signal S, that is to say:

$$\text{ambiguity} = PRI.A, \quad \text{Equation 10}$$

wherein A is an unknown constant integer.

According to some embodiments, and as explained later in the specification, the signals S, $S_n$, $S_m$ can be divided into a plurality of dwells (a dwell is generally defined as a portion of a signal comprising a plurality of modulation patterns, such as pulses). If N dwells are present, the ambiguity can be defined for each dwell as follows:

$$\text{ambiguity}_{dwell\ i} = PRI.A_i, \quad \text{Equation 11}$$

for i from 1 to N, and wherein $A_i$ is an unknown constant integer for each dwell.

The method 100 can further comprise operation 170 comprising using at least data representative of difference in times of arrival of the modulation patterns of the signals, differential phase differences $\Delta\Delta\varphi^{m,n}$, and the accuracy area to obtain one or more second estimates $\hat{e}_{Src}^k$ of the source location, wherein at least some of the second estimates of the source location, or all of these second estimates, are selected to be located within the accuracy area.

Operation 170 can rely in particular on at least one of the first estimates of the source location and the accuracy area obtained through the ddphase equations to limit the possible values of the ambiguity (multiple of the PRI) present in the difference in times of arrival of the modulation patterns of the signals. These possible values of the ambiguity can e.g. be bound within a limited set of values.

Operation 170 can comprise using the first estimate of the source location obtained through the ddphase equations to obtain an estimate of the difference in times of arrival of the modulation patterns of the signals through the DTOA equations. This estimate, together with differential phase differences $\Delta\Delta\varphi^{m,n}$ and the limited set of values of the ambiguity, can be used together to provide second estimates of the source location.

In particular, operation 170 can comprise solving a set of equations (herein after SETEQU) comprising both, for at least a pair of receiver $Rc_m$, $Rc_n$:
- equations relating differential phase differences $\Delta\Delta\varphi^{m,n}$ (between the accumulated phases at each receiver) to the position of the receivers and the position of the source location (such as Equation 8, also called ddphase equations);
- equations relating the difference in times of arrival $\Delta t^{m,n}$ of the modulation patterns of the signals to the position of the source and the position of the receivers (such as Equation 9, also called DTOA equations).

According to some embodiments, SETEQU is solved for each of a plurality of dwells.

Operation 170 can in particular comprise solving this set of equations for a limited set of values of the ambiguity present in the data representative of difference in times of arrival, such as this limited set of values of the ambiguity provides second estimates of the source location which remain within the accuracy area.

According to some embodiments, in operation 170, the first estimate $\hat{e}_{Src}$ of the source location (obtained using the ddphase equations) can be used in the DTOA equations to provide a first estimate $\Delta\hat{t}^{m,n}$ of data representative of difference in times of arrival of the modulation patterns of the signals.

According to some embodiments, in operation 170, SETEQU can be solved for all values of the difference in times of arrival of the modulation patterns of the signals which differ from $\Delta\hat{t}^{m,n}$ by an ambiguity which is within the limited set of values (this limited set of values can be calculated using the accuracy area, as explained hereinafter). The first estimate $\Delta\hat{t}^{m,n}$ generally comprises an error.

According to some embodiments, this error can be limited by comparing the first estimate $\Delta\hat{t}^{m,n}$ to data representative of difference in times of arrival of the modulation patterns of the signals $S_m$, $S_n$ received by a corresponding pair {m,n} of receivers, which were computed at operation 160 (e.g. $\Delta\bar{t}^{m,n}$), and selecting an ambiguity which limits the corresponding difference.

In any case, the first estimate $\Delta\hat{t}^{m,n}$ still comprises an error due to the presence of an ambiguity.

Operation 170 can comprise selecting a limited set of values for the ambiguity present in the first estimate $\Delta\hat{t}^{m,n}$, based on the accuracy area (this limited set of values of the ambiguity constraints the solutions of SETEQU to be located within the accuracy area), and solving SETEQU for at least some or all possible values of the ambiguity of $\Delta\hat{t}^{m,n}$ which are present in this limited set of values. Mathematical tools such as "the maximal likelihood algorithm" can be used to solve SETEQU. This is however not limitative.

In particular, the selection of the limited set of values for the ambiguity present in the data representative of the difference of time of arrivals of the modulation pattern can rely on the fact that the multiple possible solutions to SETEQU are all separated by a distance c. PRI, and thus, knowing one or more dimensions of the accuracy area, the limited set of values for the ambiguity can be selected.

For example, assume the limited set of values is written k, wherein k is the range of integers belonging to [$k_{min}$; $k_{max}$], and wherein the ambiguity in the data representative of difference in times of arrival of the modulation patterns of the signals is written k.PRI.

Operation 170 can thus comprise solving SETEQU for all values of $\Delta \hat{t}^{m,n}$+k.PRI, with k belonging to [$k_{min}$;$k_{max}$].

As mentioned, this can provide one or more second estimates of the source position, noted $\hat{e}_{Src}^{k}$, with k belonging to [$k_{min}$;$k_{max}$].

Figure 1E:
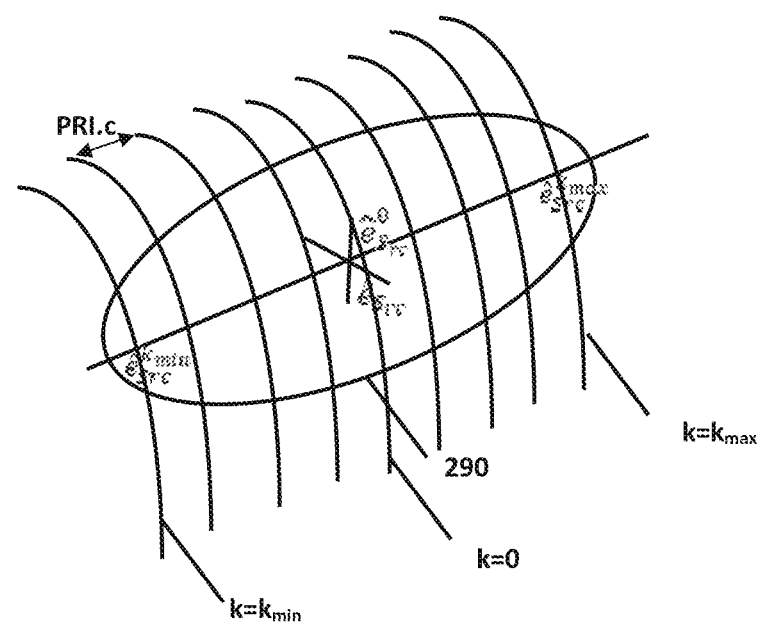
FIG. 1E is representative of additional possible estimates of the source location which match the accuracy area, associated with various possible values of an ambiguity.

A non-limitative example is provided in FIG. 1E, in which a plurality of second estimates $\hat{e}_{Src}^{k}$ of the source location are provided, all located within the accuracy area.

According to some embodiments, for each value of k, SETEQU is solved to provide second estimates $\hat{e}_{Src}^{k}$. As mentioned, algorithms such as the maximal likelihood algorithm can be used. This is however not limitative.

$\hat{e}_{Src}^{k}$ can be viewed as the intersection between N hyperboloids (corresponding to surfaces representing the geometric location of the solutions of the DTOA equations, for the N dwells) and N iso-ddphase surfaces (corresponding to surfaces representing the geometric location of the solutions of the ddphase equations, for the N dwells).

In some embodiments, a digital terrain model is used and it is assumed that the source is located on the surface of this terrain. Thus, $\hat{e}_{Src}^{k}$ can be found as the intersection between the N hyperboloids, the N iso-ddphase surfaces and the digital terrain model. This is however not limitative.

Operation 170 can comprise performing an optimization process to find one or more optimal values $k'_{opt}$ among the range [$k_{min}$;$k_{max}$], which are associated with corresponding $\hat{e}_{Src}^{k'_{opt}}$ which are solutions of the ddphase and difference in times of arrival equations.

According to some embodiments, this optimization process can comprise performing an optimization of a function representative of an error of a solution to the equations based on the data representative of difference in times of arrival of the signals (DTOA equations of SETEQU) and/or of an error of a solution of the equations based on the differential phase differences (ddphase equations of SETEQU).

This optimization process can comprise e.g. minimizing an error of a solution to these equations.

This optimization process thus yields at least one optimal value $k'_{opt}$, and thus at least one associated estimate of the source position $\hat{e}_{Src}^{k'_{opt}}$.

In some embodiments, this optimization process can be performed using the maximal likelihood algorithm mentioned above. This is however not limitative.

Over time, the volume of received data (data representative of the differential phase differences and of the difference in times of arrival) becomes larger, and thus the solution to the equations becomes more precise. Thus, after some convergence time, a single refined estimate $\hat{e}_{Src}^{k'_{opt}}$ can be obtained.

Attention is now drawn to FIG. 2, which represents a possible embodiment of a method of performing operation 160.

As shown in FIG. 2, the method can comprise operation 164, which comprises processing the received signal $S_n$ and recording the times of arrival of specific portion(s) of the signal $S_n$ at the receivers $Rc_n$. In other words, this operation 164 can comprise determining the receipt timings of modulated portions/sections of the received signals {$S_n$}.

In this connection, it should be understood that in case the signal S from the signal source is a signal which includes one or more modulation patterns (e.g. pulses) $p_j^{(n)}$, indexed j, then the time of arrivals (TOAs) $TOA_{pj}^{(n)}$ of the arrival of a modulation pattern (e.g. pulse) $p_j^{(n)}$ (indexed j) at each receiver {$Rc_n$} may be recorded. Thus, the first pulse received by receiver $Rc_n$ is $p_1^{(n)}$, the second pulse received by receiver $Rc_n$ is $p_2^{(n)}$, etc.

In particular, the corresponding signals {$S_n$} respectively obtained by the receivers {$Rc_n$} can be processed (e.g. sampled and analyzed) to identify at least one modulation-pattern/pulse $p_j^{(n)}$ therein (such identification can be performed by e.g. cross-correlation with signals received by other receivers and/or by identifying predetermined modulation patterns, such as the rise/fall time of a pulse—this is however not limitative).

Then, the times of arrival (TOAs) $TOA_{pj}^{(n)}$ of the at least one pulse/modulation pattern $p_1^{(n)}$ at two or more of the receivers {$Rc_n$} are recorded. These data can be sent from each receiver to a central processing utility.

In case the signal source emits a modulated CW signal S (i.e. not pulsed), the TOAs {$TOA_{p1}^{(n)} \ldots TOA_{pK}^{(n)}$} of the signal S to the n different receivers {$Rc_n$} may be determined by e.g. cross correlating the signals {$S_1 \ldots S_n$} received by different receivers to determine/measure the relative time difference between their reception times.

Operation 164 can be performed by a central processing utility or e.g. by one or more processing units included/located at/near the receivers $Rc_1$-$Rc_n$ and adapted to process the signals $S_1$-$S_n$ respectively received thereby to identify their profile (rise and/or fall times) and thereby determine the times of arrival of the different pulses by the different receivers, According to some embodiments, sync data indicative of time synchronization of the receivers may be obtained and used to process and synchronize the times of arrival obtained by the receivers {$Rc_n$}. The sync data may be data indicative of time differences/lags between the clocks of the different receivers and a certain reference clock. The sync data may be obtained by any suitable known in the art time sync technique. Accordingly, the times of arrival may be synced by adding thereto the corresponding time lag. This is however not mandatory.

The method can further comprise operation 166, in which the differential time of arrival (DTOA) $\Delta t_{pj}^{m,n}$ between the times of arrival of at least one pulse $P_j$ to the one or more pairs {m,n} of the receivers is determined/computed. The DTOA may be computed in operation 166 (e.g. by a processing unit of the central processing utility, or by a processing unit associated to a receiver if the receiver communicates TOA data with other receivers) as follows:

$$\Delta t_{pj}^{m,n} = t_{pj}^{m} - t_{pj}^{n} \qquad \text{Equation 12}$$

The DTOA can be calculated for all pulses received within a given period of time, such as within each dwell among a plurality of dwells.

It has already been mentioned that the modulation pattern $p_j^{(m)}$ received at receiver $Rc_m$ from the source Src and the modulation pattern $p_j^{(n)}$ received at receiver $RC_n$ from the source Src do not necessarily correspond to the same modulation pattern of the signal S, due to the presence of an ambiguity, which can be expressed e.g. as multiple of the PRI of signal S.

According to some embodiments, the method can comprise operation 167, in which data representative of the DTOA can be calculated over a particular period of time, such as over a dwell.

For example, the average DTOA, or other statistical data representative of the DTOA over a period of time (such as median, etc.), such as over a dwell, can be computed. The following computation can be performed (the example of a dwell is taken, but this is not limitative):

$$\Delta \bar{t}_i^{m,n} = \text{mean}_{p_j \in dwell\ i}(TOA_{p_j}^{(m)} - TOA_{p_j}^{(n)}), \quad \text{Equation 13}$$

wherein "i" is the number of the dwell (e.g. there are N dwells).

Since an ambiguity is present, $\Delta \bar{t}_i^{m,n}$ comprises an ambiguity and thus we get (using Equation 11):

$$\Delta t_i^{m,n} = \Delta \bar{t}_i^{m,n} + PRI.A_i,$$

for each dwell i, wherein $\Delta t_i^{m,n}$ corresponds to all possible values of data representative of the DTOA of the modulation patterns that can be computed over a dwell i (these possible values depend on the unknown value of the ambiguity).

Attention is now drawn to FIG. 3 which describes possible embodiments of a method of performing operations 150 to 170. These embodiments are exemplary and not limitative.

As already mentioned with respect to FIG. 1A, operation 150 can comprise determining a first estimate of the location of the signal source based on the differential phase $\Delta\Delta\varphi^{m,n}$ between the accumulated phases, $\Delta\varphi^m$ and $\Delta\varphi^n$, of the one or more pairs {m,n} of receivers and their respective positions.

According to some embodiments, differential phase differences $\Delta\Delta\varphi^{m,n}$ between accumulated phases can be calculated over one or more periods of time, also called dwells. Assume there are N dwells, wherein each dwell is indexed by integer "i". Thus, differential phase differences between accumulated phases can be obtained for each dwell, and can be written $\Delta\Delta\varphi_i^{m,n}$.

Operation 350 (which can be part e.g., of operation 150) can comprise solving, for at least one dwell, or for at least two dwells, the following equation (which is equivalent to Equation 8 cited above, but expressed for each dwell):

$$\Delta\Delta\varphi_i^{m,n} = \frac{2\pi f}{c}[(\|e_{Src} - R_m(t_{p1,i}^{(m)})\| - \|e_{Src} - R_n(t_{p1,i}^{(n)})\|) - \quad \text{Equation 15}$$
$$(\|e_{Src} - R_m(t_{pK,i}^{(m)})\| - \|e_{SRC} - R_n(t_{pK,i}^{(n)})\|)]$$

In Equation 15, $p_{j,i}^{(n)}$ the $i^{th}$ pulse received within dwell i by receiver $Rc_n$.

In addition, $t_{pj,i}^{(n)}$ can be defined as follows. Every modulation pattern or pulse $p_{j,i}^{(n)}$ dwell i, which is received by a receiver $Rc_n$ at time $TOA_{pj}^{(n)}$ is active between time $TOA_{pj,i}^{(n)}$ and $TOA_{pj,i}^{(n)} + \varepsilon$, wherein $\varepsilon$ is the duration of the modulation pattern or of the pulse. Time $t_{pj,i}^{(n)}$ is a particular time which is chosen between $TOA_{pj,n}^{(n)}$ and $TOA_{pj,n}^{(n)} + \varepsilon$, generally as a multiple of the time clock step. This choice is a matter of definition and other definitions can be used.

Equation 15 reflects the fact that a differential phase difference $\Delta\Delta\varphi_i^{m,n}$ of the modulation patterns received at a pair of the receivers $Rc_m$ and $Rc_n$, is indicative of a distance difference between the changes in the distances of the respective receivers $Rc_n$ and $Rc_n$ from the signal source during the time interval of the dwell.

By solving Equation 15 for one or more dwells, a first estimate $\hat{e}_{S_{rc}}$ of the source location can be obtained. In addition, for a given "e" which is solution of Equation 15 (such as $e = \hat{e}_{S_{rc}}$) an error $\varepsilon_{\Delta\Delta\varphi_i^{m,n}}(e)$ is present. According to some embodiments, statistical data representative of this error can be computed, such as the standard deviation $\sigma_{\Delta\Delta\varphi_i^{m,n}}(e)$.

As already mentioned above (see operation 150), an accuracy area, around the estimated position $\hat{e}_{S_{rc}}$, is also obtained.

In operation 360 (which can be part e.g. of operation 160), difference in times of arrival of modulation patterns of the signals ($\Delta \hat{t}_i^{m,n}$) within each dwell can be estimated using the first estimate $\hat{e}_{S_{rc}}$.

In other words, the first estimate $\hat{e}_{S_{rc}}$ of the source location can be injected in the DTOA equations in order to find a first estimate $\Delta \hat{t}_i^{m,n}$ of the difference in times of arrival of the signals within each dwell (in particular of the average DTOA over all pulses within a dwell).

In addition, as already mentioned above, the difference in times of arrival of the modulation patterns of the signals comprises an ambiguity. Thus, the estimate $\Delta t_i^{m,n}$ comprises an error due to the ambiguity, which can be limited by using the value of the difference in times of arrival of modulation patterns of the signals that was computed in operation 167.

The following equations can be solved, for each dwell i:

$$\Delta \hat{t}_i^{m,n} = \frac{1}{c}(\|\hat{e}_{S_{rc}} - R_m(\bar{t})\| - \|\hat{e}_{S_{rc}} - R_n(\bar{t})\|) + \text{error} \quad \text{Equation 16}$$

$$|\text{error}| \le \frac{PRI}{2}$$

$$\Delta \hat{t}_i^{m,n} = \Delta \bar{t}_i^{m,n} + PRI.\hat{A}_i^{m,n}$$

wherein $\hat{A}_i^{m,n}$ is a suitable integer.

In Equation 16, $\hat{e}_{S_{rc}}$, $R_m(\bar{t})$, $R_n(\bar{t})$, PRI, c, $\Delta \bar{t}_i^{m,n}$, are the known inputs. Equation 16 is solved to find $\hat{A}_i^{m,n}$ and therefore the value $\Delta \hat{t}_i^{m,n}$, for each dwell i.

In this equation, $\bar{t}$ is the time at the center of the dwell. This choice is a matter of definition and other times in the dwell can be used.

At the output of operation 360, we thus obtain an estimate $\Delta \hat{t}_i^{m,n}$ of the difference of times of arrival of the modulation patterns within each dwell (which is e.g. representative of an average of this value within each dwell).

As shown in FIG. 1E, a solution to both the DTOA equations and ddphase equations based on $\Delta\Delta\varphi_i^{m,n}$ and $\Delta \hat{t}_i^{m,n}$ is the value $\hat{e}_{S_{rc}}^0$ (which is the closest value to $\hat{e}_{S_{rc}}$ obtained based only on the ddphase equations).

$\hat{e}_{S_{rc}}^0$, which is associated to $\Delta \hat{t}_i^{m,n}$, provides only an estimate of the real location of the source since the ambiguity related to the PRI is still present.

As illustrated in FIG. 1E, $\Delta \hat{t}_i^{m,n} + k.PRI$ can also be used in the DTOA equations to estimate the source location, wherein k is to be determined.

In some embodiments, the value of k can be approximated as independent from the dwells. This approximation is particularly relevant over time, when the volume of data increases, since the accuracy area becomes narrower.

Operation 370 (which can be part e.g. of operation 170) can comprise selecting a set of limited values for the multiple of the PRI for which the solutions to the DTOA equations (and to the ddphase equations) are (all of them, or at least some of them) within the accuracy ellipse.

As shown in FIG. 1E, the accuracy ellipse, whose center is generally located near $\hat{e}_{S_{rc}}^0$, can be used to limit the possible values of k. Indeed, all possible solutions to the DTOA equations and to the ddphase equations are separated by a distance which is a multiple of PRI.c.

In particular, if we assume that L is the length along the long axis of the accuracy ellipse (this can apply to any accuracy area which is not an ellipse, by selecting the long axis of the accuracy area), k can be selected between $K_1$ and $K_2$, wherein:

$$K_1 = \frac{\frac{-L}{2}}{PRI \cdot c} \text{ and } K_2 = \frac{\frac{+L}{2}}{PRI \cdot c}$$

Once a limited set of values has been obtained for k, the DTOA equations and the ddphase equations can be solved to find other possible estimate $\hat{e}_{S_{rc}}^k$ for the source location.

For all dwells i (i from 1 to N), and for k between $K_1$ and $K_2$, the following equations can be solved (equivalent to SETEQU mentioned above, but this time for each of a plurality of dwells, thus noted $SETEQU_i$):

$$\Delta\Delta\varphi_i^{m,n} = \frac{2\pi f}{c}\Big[(\|\hat{e}_{S_{rc}}^k - R_m(t_{p1,i}^{(m)})\| - \|\hat{e}_{S_{rc}}^k - R_n(t_{p1,i}^{(n)})\|) -$$
$$(\|\hat{e}_{S_{rc}}^k - R_m(t_{pK,i}^{(m)})\| - \|\hat{e}_{S_{rc}}^k - R_n(t_{pK,i}^{(n)})\|) +$$
$$\varepsilon_{\Delta\Delta\varphi_i^{m,n}}(\hat{e}_{S_{rc}}^k)](ddphase \text{ equations})\Delta t_i^{m,n} + k.PRI =$$
$$\frac{1}{c}(\|\hat{e}_{S_{rc}}^k - R_m(T)\| - \|\hat{e}_{S_{rc}}^k - R_n(T)\|) +$$
$$\varepsilon_{\Delta t_i^{m,n}}(\hat{e}_{S_{rc}}^k)(DTOA \text{ equations})$$

Equation 17

In these equations, $\varepsilon_{\Delta\Delta\varphi_i}^{m,n}$ is the error of the ddphase equations and $\varepsilon_{\Delta t_i}^{m,n}$ is the error of the DTOA equations.

A plurality of possible estimate $\hat{e}_{S_{rc}}^k$ is obtained, one for each value of k. This can be seen in FIG. 1E.

Operation 380 (which can be part of operation 170) can comprise selecting one or more values for k, and thus of corresponding estimates $\hat{e}_{S_{rc}}^k$, which meet an optimization criterion. This can comprise minimizing a function representative of:
- an error of a solution to the equations based on the data representative of difference in times of arrival of the signals (DTOA equations of $SETEQU_i$), and/or
- an error of a solution to the equations based on the differential phase differences (ddphase equations of $SETEQU_i$).

In particular, according to some embodiments, the following optimization criterion can be used. For each integer k between $K_1$ and $K_2$, we define:

$$\text{Likelihood}(k) = \sum_{i=1}^{N}\left(\frac{\varepsilon_{\Delta t_i^{m,n}}(\hat{e}_{S_{rc}}^k)}{\sigma_{\Delta t_i^{m,n}}(\hat{e}_{S_{rc}}^k)}\right)^2 + \sum_{i=1}^{N}\left(\frac{\varepsilon_{\Delta\Delta\varphi_i^{m,n}}(\hat{e}_{S_{rc}}^k)}{\sigma_{\Delta\Delta\varphi_i^{m,n}}(\hat{e}_{S_{rc}}^k)}\right)^2$$

Equation 18

Let $\hat{k}$ be the integer that brings to minimum the likelihood function. Then $\hat{e}_{S_{rc}}^{\hat{k}}$ can be selected as the best estimate of the location of the source. According to some embodiments, a plurality of values $\hat{k}$ can be obtained, for example which provides a value of the likelihood function which is close to the minimum. Thus, other possible solutions $\hat{e}_{S_{rc}}^k$ can be obtained.

According to some embodiments, over time, when the number of dwells N increases, a sharper minimum of the likelihood function can be obtained, thus yielding to a unique solution $\hat{k}$ and to a unique estimate $\hat{e}_{S_{rc}}^{\hat{k}}$ of the source location.

According to some embodiments, when new data are received, operations 130-170 can be applied again to a larger set of data comprising both the old data and the newly received data, in order to refine the estimate of the source location.

According to some embodiments, the one or more estimates of the source location obtained based on the old data can be used together with the newly received data in order to refine the estimate of the source location. This can be used in particular when the ambiguity present in the signals received by the receivers has been cancelled or reduced using the old data.

The method can comprise repeating operations 164, 166 and 167 using the new data. In addition, operation 360 can be repeated. In operation 360, a first estimate of the source location is needed. The estimate of the source location obtained based on the old data can be used as this first estimate.

Then, a new estimate of the source location can be computed using the new DTOA and ddphase equations, the estimate of the source location obtained based on the old data, and an old covariance matrix of the errors of the estimation of the location of the source (which can be calculated based on the old DTOA and ddphase equations and the covariance matrix of the errors of the parameters/measurements).

Operations 370 and 380 need not to be repeated, since the ambiguity has been cancelled or reduced based on the old data.

Figure 4:
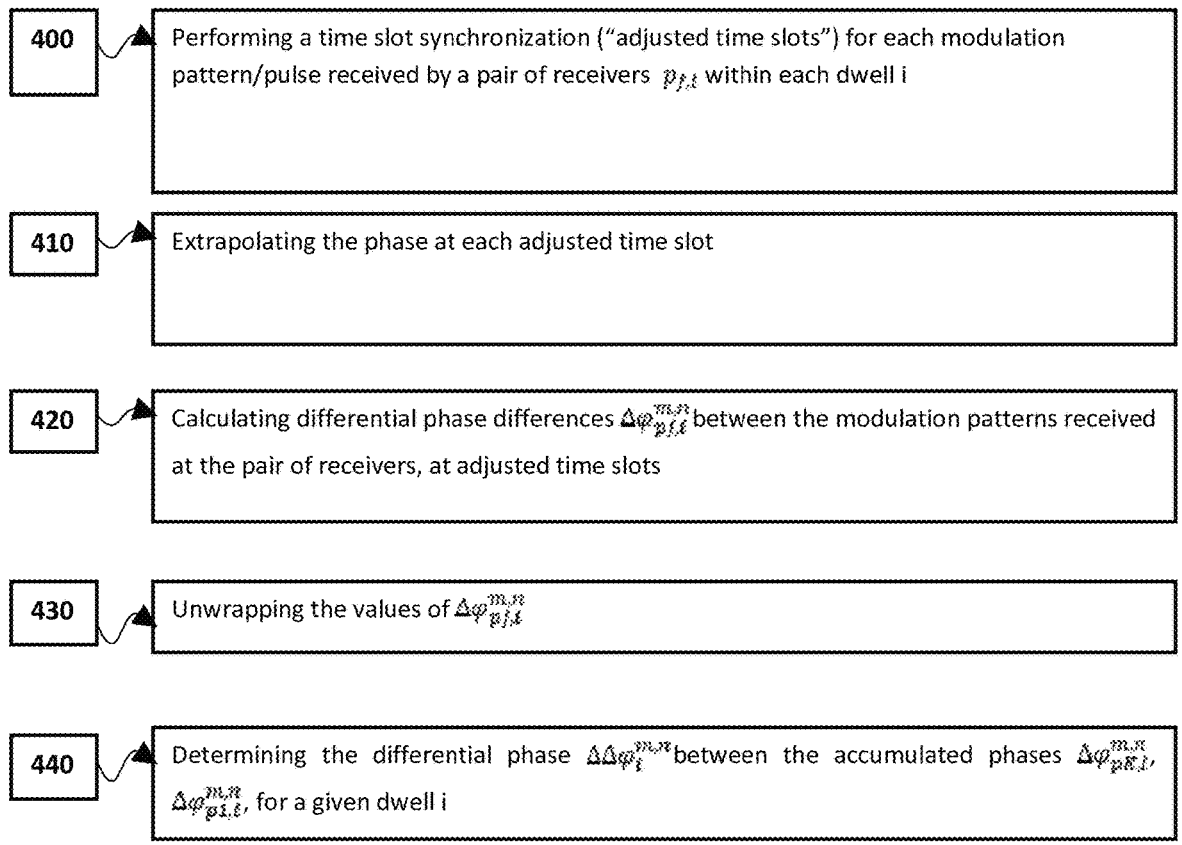
FIG. 4 is representative of an embodiment of a method of determining differential phase differences between accumulated phases of signals received by at least one pair of receivers.

Attention is now drawn to FIG. 4, which describes possible embodiments of a method of computing $\Delta\Delta\varphi_i^{m,n}$.

The method can comprise synchronizing the time slots of the pulses between the pair(s) of receivers. This is however not mandatory and is described as a possible example only.

As mentioned above, every modulation pattern or pulse $p_{j,i}^{(m)}$ of dwell i, which is received by a receiver $Rc_m$ at time $TOA_{pj,i}^{(m)}$, is active between time $TOA_{pj,i}^{(m)}$ and $TOA_{pj,i}^{(m)}+\varepsilon$, wherein $\varepsilon$ is the duration of the modulation pattern or of the pulse. Time $t_{pj,i}^{(m)}$, also called "time slot", is a particular time which is chosen between $TOA_{pj,i}^{(m)}$ and $TOA_{pj,i}^{(m)}+\varepsilon$, generally as a multiple of the time clock step.

In order to synchronize the time slots between the receivers $Rc_m$ and $Rc_n$ within a dwell i (or within a given duration), the method can comprise operation 400 comprising calculating the difference in time between the time slot $t_{p1,i}^{(m)}$ of the first pulse $p_{1,i}$ received by receiver $Rc_m$ within dwell i and the time slot $t_{p1,i}^{(n)}$ of the first pulse $p_{1,i}$ received by receiver $Rc_m$ within dwell i.

The following computation can be performed:

$$\Delta\tau = t_{p1,i}^{(m)} - t_{p1,i}^{(n)}$$

Equation 19

Then, the value of $\Delta\tau$ can be added to the time slots of the other pulses received by receiver $Rc_m$, in order to obtain adjusted time slots.

The following computation can be performed:

$$\hat{t}_{pj,i}^{(m)} = t_{pj,i}^{(m)} + \Delta\tau$$

Equation 20

In this equation, $\hat{t}_{pj,i}^{(m)}$ is the adjusted time slot of pulse $p_{j,i}^{(m)}$ received by receiver $Rc_m$ within dwell i.

The value of the phase $\varphi_{pj,i}^{(m)}$ of the signal received by each receiver $Rc_m$ at each time slot $t_{pj,i}^{(m)}$ can be measured e.g. by a processing unit located at each receiver.

Operation 410 can comprise extrapolating the phase at each adjusted time slot $\hat{t}_{pj,i}^{(m)}$.

The following computation can be performed:

$$\hat{\varphi}_{pj,i}^{(m)} = \varphi_{pj,i}^{(m)} + (\hat{t}_{pj,i}^{(m)} - t_{pj,i}^{(m)}) \cdot \frac{d\varphi_{pj,i}^{(m)}}{dt}$$

Equation 21

Operation 420 can comprise calculating differential phase differences between the modulation patterns received at the pair of receivers (differential phase differences between the first modulation pattern received at the pair of receivers, between the second modulation pattern, etc.). The differential phase differences can be calculated at the adjusted time slots.

The following computation can be performed:

$$\Delta\varphi_{pj,i}{}^{m,n} = \hat{\varphi}_{pj,i}{}^{(m)} - \varphi_{pj,i}{}^{(n)} \qquad \text{Equation 22}$$

Operation 430 can comprise unwrapping the values of $\Delta\varphi_{pj,i}{}^{m,n}$. This comprises e.g. adding iteratively to the phase $\Delta\varphi_{pj,i}{}^{m,n}$ a multiple of $2\cdot\pi$ so that the absolute value of the phase difference of each two consecutive values of $\Delta\varphi_{pj,i}{}^{m,n}$ is less than $\pi$.

According to some embodiments, the phases $\hat{\varphi}_{pj,i}{}^{(m)}$ and $\varphi_{pj,i}{}^{(n)}$ are first unwrapped. This comprises e.g. adding iteratively to the phase $\hat{\varphi}_{pj,i}{}^{(m)}$ and $\varphi_{pj,i}{}^{(n)}$ a multiple of $2\cdot\pi$ so that the absolute value of the phase difference of each two consecutive pulses is less than $\pi$ Then, after this unwrapping operation, $\Delta\varphi_{pj,i}{}^{m,n}$ is computed.

Possible embodiments for unwrapping the phases of the pulses or of the accumulated phase over a given time interval will be described with reference to FIGS. 7A and 7B.

The value $\Delta\varphi_{pj,i}{}^{m,n}$ has an ambiguity which is a multiple of $2\cdot\pi$.

Operation 440 can comprise determining the differential phase $\Delta\Delta\varphi_i{}^{m,n}$ between the accumulated phases, for a given dwell i, which may be computed according to Equation 23.

$$\Delta\Delta\varphi_i{}^{m,n} = \Delta\varphi_{pK,i}{}^{m,n} - \Delta\varphi_{p1,i}{}^{m,n} \qquad \text{Equation 23}$$

In Equation 23, $p_{k,i}$ is the last pulse of dwell i and $p_{1,i}$ is the first pulse of dwell i.

Another possibility to compute $\Delta\Delta\varphi_i{}^{m,n}$ is to calculate $\Delta\varphi_i{}^m$ which is the accumulated phase of receiver $Rc_m$ within dwell i ($\Delta\varphi_i{}^m = \hat{\varphi}_{pK,i}{}^{(m)} - \hat{\varphi}_{p1,i}{}^{(m)}$), and to calculate $\Delta\varphi_i{}^n$ which is the accumulated phase of receiver $Rc_n$ within dwell i ($\Delta\varphi_i{}^n = \varphi_{pK,i}{}^{(n)} - \varphi_{p1,i}{}^{(n)}$), and then to compute $\Delta\Delta\varphi_i{}^{m,n} = \Delta\varphi_i{}^m - \Delta\varphi_i{}^n$.

The differential phase $\Delta\Delta\varphi_i{}^{m,n}$ of a dwell comprises an ambiguity, which is a multiple of $2\cdot\pi$. This is due in particular to the fact that $\Delta\varphi_{pj,i}{}^{m,n}$ comprises such an ambiguity.

Operations 400 and 410 can be performed at each receiver, or at the central processing utility. Operations 420 to 440 are generally performed at the central processing utility (or at a receiver if data pertaining to the phase values are exchanged between the receivers).

Figure 5:
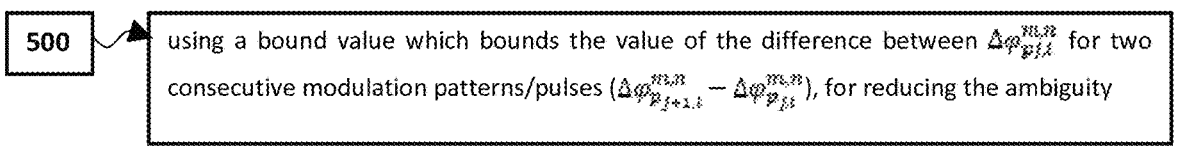
FIGS. 5 and 6 describe possible methods of reducing an ambiguity present in the accumulated phases and/or in the differential phase differences between the accumulated phases.
Figures 6, 7A:
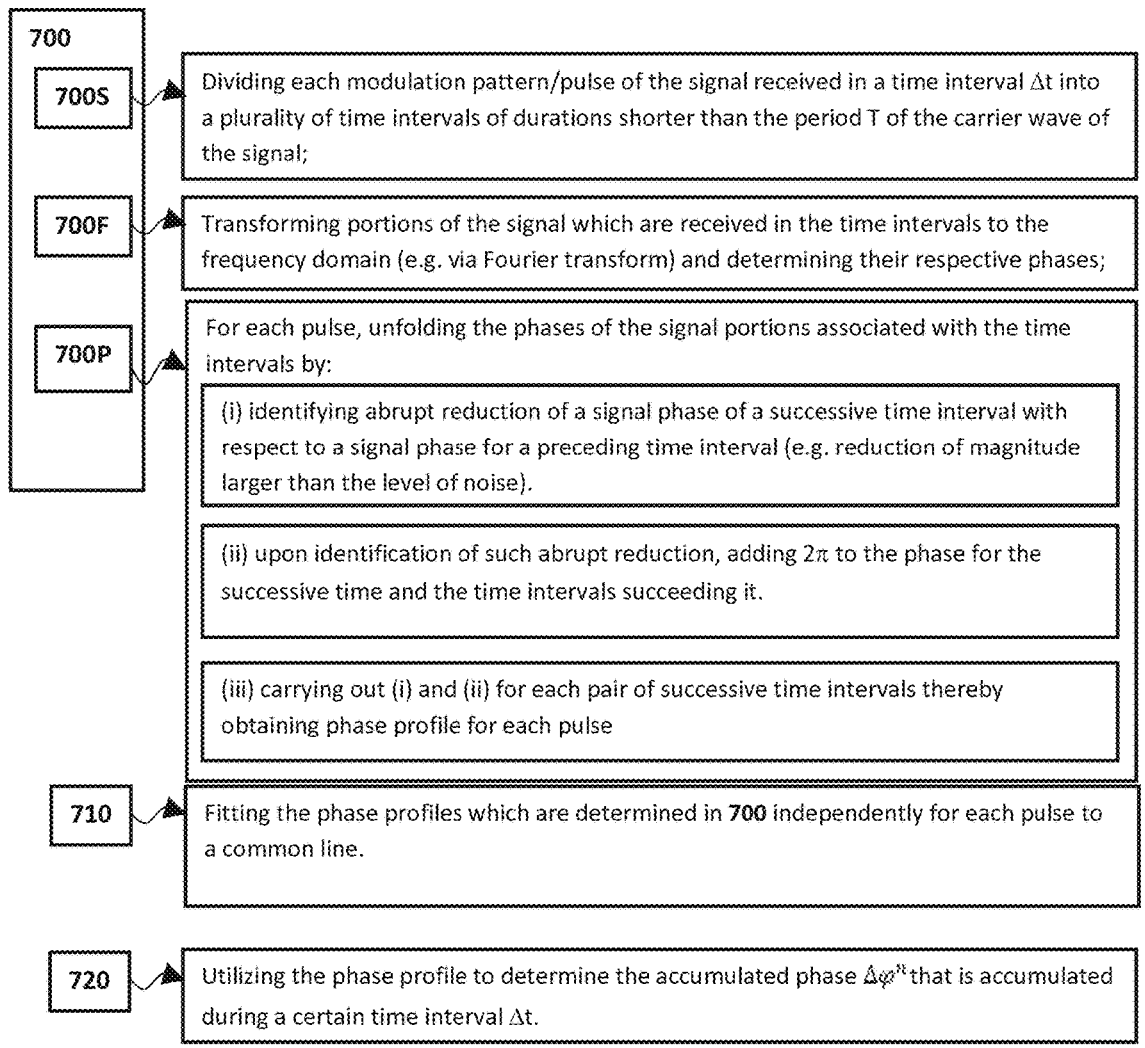
FIGS. 7A and 7B illustrate possible embodiments of methods of determining the phases and unwrapping the phases of modulation patterns received at each receiver.

Attention is drawn to FIGS. 5 and 6 which describe possible methods of reducing the ambiguity present in the accumulated phases and/or in the differential phase differences between the accumulated phases.

As shown in FIG. 5, a first method can comprise operation 500 which comprises using a bound value which bounds the value of the difference between $\Delta\varphi_{pj,i}{}^{m,n}$ for two consecutive modulation patterns/pulses (that is to say that bounds $\Delta\varphi_{p_{j+1,i}}{}^{m,n} - \Delta\varphi_{p_{j,i}}{}^{m,n}$).

The following computation can be performed:

$$\left|\Delta\varphi_{pj+1,i}^{m,n} - \Delta\varphi_{pj,i}^{m,n}\right| \leq \frac{2\pi f}{c}(v_m + v_n)\cdot pri_j^n, \qquad \text{Equation 24}$$

$$\text{wherein } v_m = \left\|\frac{dR_n}{dt}\right\|, v_n = \left\|\frac{dR_n}{dt}\right\|, \text{ and } pri_{j,i}^n = t_{pj+1,i}^{(n)} - t_{pj,i}^{(n)}$$

This limits the possible number of values for $\Delta\varphi_{pj,i}{}^{m,n}$ and thus reduces the ambiguity.

Attention is drawn to FIG. 6 which illustrates a second method of limiting the ambiguity (which can be performed in addition to the first method of FIG. 5, or alternatively to the first method of FIG. 5).

This second method can rely on a rough estimation obtained using the DTOA technique. Operation 600 can comprise in particular utilizing the differential times of arrival $\Delta t_{p_j}{}^{m,n}$, $\Delta t_{p_i}{}^{m,n}$ of two or more pulses $p_j$ and $p_i$ to reduce the ambiguity which can be present in $\Delta\Delta\varphi_i{}^{m,n}$.

This is based on the understanding that the differential phase $\Delta\Delta\varphi^{m,n}$, which is indicative of a difference $\Delta d_n - \Delta d_m$ between the changes $\Delta d_n$ and $\Delta d_m$ in the distances, $d_n$ and $d_m$, of the respective receivers $Rc_m$ and $Rc_n$ from the signal source Src during the time interval $\Delta t$, corresponds to the difference $\Delta t_{p_j}{}^{m,n} - \Delta t_{p_i}{}^{m,n}$ between the differential times of arrival $\Delta t_{p_j}{}^{m,n}$, $\Delta t_{p_i}{}^{m,n}$ of two pulses $p_j$ and $p_i$ (which respectively occur at the beginning and the end of a time interval $\Delta t'$) to the receivers $Rc_n$ and $Rc_m$. More specifically, the differential phase $\Delta\Delta\varphi^{m,n}$ (ddphase) over the time interval $\Delta t$ should be proportional to the differential times of arrival of the pulses $p_j$ and $p_i$ occurring at the beginning and end of the pulses in the dwell within the time interval $\Delta t'$. More specifically, the differential phase $\Delta\Delta\varphi^{m,n}$ should satisfy the following relation:

$$\frac{\Delta\Delta\varphi^{m,n}}{\Delta t} \approx 2\pi f \frac{\Delta t_{p_j}^{m,n} - \Delta t_{p_i}^{m,n}}{\Delta t'} \qquad \text{Equation 25}$$

where f represents the frequency of the signal S.

In many cases, the differential phase and the differential times of arrival is measured/computed for one or more dwells of pulses. In this case, Equation 25 above may be represented as follows $$\frac{\Delta\Delta\varphi_i^{m,n}}{\Delta t^i} \approx \frac{\Delta\Delta\varphi_j^{m,n}}{\Delta t^j} \approx 2\pi f \frac{\Delta t_{p_j}^{m,n} - \Delta t_{p_i}^{m,n}}{\Delta t'} \qquad \text{Equation 26}$$

where $\Delta\Delta\varphi_i{}^{m,n}$ is the measured differential phase over the time interval $\Delta t^i$ of the first dwell i, $\Delta\Delta\varphi_j{}^{m,n}$ is the measured differential phase over the time interval $\Delta t^j$ of the second dwell j and $\Delta t'$ is the difference between the time at the center of dwell i and the time at the center of dwell j.

Thus, the expression of Equation 26 above can be used to set-bounds-to/estimate the possible values that the differential phase $\Delta\Delta\varphi_i{}^{m,n}$ can acquire for each dwell i. Accordingly, in some embodiments of the present invention, operation 600 is incorporated/included in 130, in which the relation of Equation 26 is used to disambiguate the differential phase $\Delta\Delta\varphi^{m,n}$ or $\Delta\Delta\varphi_i{}^{m,n}$ calculated in 130.

This may be achieved for example by modifying the differential phase $\Delta\Delta\varphi^{m,n}$, expressed in Equation 8 above, to read as follows:

$$\Delta\Delta\varphi^{m,n} = 2\pi/\lambda(\Delta d_m - \Delta d_n) + 2\pi Z \qquad \text{Equation 27}$$

where Z is an integer number that is selected such that the differential phase $\Delta\Delta\varphi^{m,n}$ (or $\Delta\Delta\varphi_i{}^{m,n}$ for a dwell) is within the boundaries given by the errors in the DTOA measurements set by Equation 26.

In the above example the DTOA positioning technique provides for resolving possible ambiguities in the differential phase $\Delta\Delta\varphi^{m,n}$. Alternatively, or additionally, information of other positioning techniques (e.g. from the differential Doppler technique) may also be used for resolving this ambiguity in the differential phase $\Delta\Delta\varphi^{m,n}$.

Figure 7B:
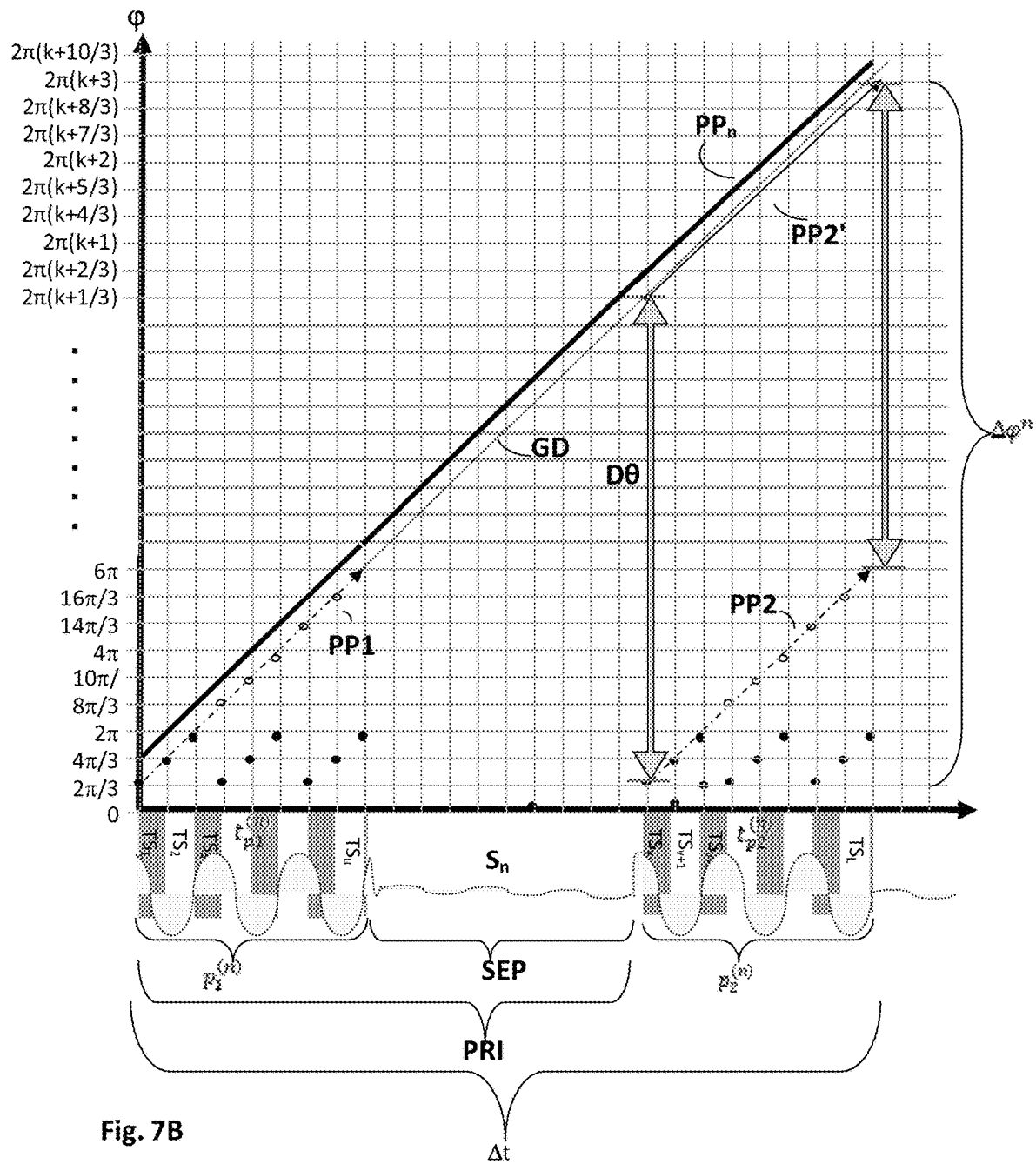

Reference is now made together to FIGS. 7A and 7B illustrating possible embodiments of methods of determining the phases and unwrapping the phases of pulses received at each receiver.

Assume a signal $S_n$ is received at receiver $Rc_n$. This signal comprises two of more pulses $p_1^{(n)}$ and $p_2^{(n)}$.

In operation 700S, each modulation pattern/pulse received in a certain time interval $\Delta t$ can be sampled/divided into a plurality of samples corresponding to time intervals $TS_1$-$TS_L$ of durations shorter than half the period T (being one over the frequency f) of the carrier wave of the signal. In FIG. 7B, the time slots $t_{p1}^{(n)}$, $t_{p2}^{(n)}$ (which are located within each pulse, and were defined in reference to FIG. 4), are also illustrated.

Then in operation 700F portions/samples $\{TS_L\}$ of the pulse corresponding to the time intervals can be transformed into the frequency domain (e.g. via Fourier transform) and their respective phases $\{\varphi_L\}$ modulus $2\pi$ can be determined. The phases are therefore bounded within a range of $2\pi$ (e.g. in the range $[0, 2\pi]$ or $[-\pi, \pi]$). The phases $\{\varphi_L\}$ modulus $2\pi$ of the signal portions (samples) $\{TS_L\}$ obtained in that way are illustrated by the blackened points in FIG. 7B.

Operation 700P can include unfolding (unwrapping) the phases $\{\varphi_L\}$, to unwrap the modular representation of the phases such that each phase $\varphi_L$ will present the actual phase of the signal $S_n$ accumulated from the beginning of the pulse until the time of the respective time interval $TS_L$. The unwrapped phases are illustrated by the hollow circles in FIG. 7B.

Operation 700P may be carried out by various techniques. For example in some cases sub operations (i) to (iii) are carried out as described in the following:

700P.(i) process the phases $\{\varphi_L\}$ to identify abrupt reduction in the phase $\varphi_{k+1}$ of a successive time interval $TS_{k+1}$ with respect to a signal phase $\varphi_k$ of a time interval $TS_k$ preceding it. To this end, abrupt reduction may be considered a decrease (or increase) of more than $\pi$ in the phase value whose magnitude is larger than the level of noise associated with the receiver.

700P.(ii) upon identification of such abrupt reduction, adding multiples of $2\pi$ to the phase $\varphi_{k+1}$ for the successive time $TS_{k+1}$ and also to all the phases $\varphi_{k+2}$-$\varphi_L$ of the time intervals succeeding it for this pulse; and

700P.(iii) carrying out 700P.(i) and 700P.(ii) for each pair of successive time intervals of this pulse.

Operation 700 can be performed for each pulse separately.

According to some embodiments, if the phases are required only on specific time points, such as at the time slots, the phases can be unwrapped only at these time slots, instead of unwrapping the phases at each time interval of each pulse. Operation 700 can be applied similarly to these specific time points.

This provides for unwrapping the phases $\{\varphi_L\}$ and obtaining the unwrapped phase profiles PP1 and PP2 of the signal $S_n$, as illustrated in the dashed line in FIG. 7B.

The signal sections may be, for example, pulses of duration in the order of microseconds (e.g. 1 μSec) which are transmitted with pulse repetition interval (PRI) in the order of microseconds (e.g. 10 μSec). Accordingly, the time separation between the pulses may be in the order of the PRI.

As indicated above, the operation 700 may be implemented near/at each/some of the receivers and/or at the central processing utility, depending on the implementation of system 200.

The purpose of operation 710 is to obtain data indicative of the phase profile $PP_n$ of the signal $S_n$ during the entire time interval $\Delta t$, from which the accumulated phase $\Delta \varphi^n$ during the time interval $\Delta t$ can be determined/estimated. In 710 the phase profile $PP_n$ for the entire time interval $\Delta t$ is obtained by fitting the phase profile PP1 and PP2 onto a common line. As indicated above, this may be performed at the central processing utility. For example, the phase profile PP1 of the first pulse/modulated-section $p_1^{(n)}$ the received signal $S_n$ is used to construct the guideline GD illustrated in the figure FIG. 7B. The phase profile PP2 of the second pulse/modulated-section $p_2^{(n)}$ of the received signal $S_n$ is fitted/matched to the guideline GD by adding thereto a certain phase value $D\theta$, which is an integral multiple of $2\pi$, selected in accordance with the time separation SEP between the pulses, which may be for example estimated from the derivative of the phase profile(s) PP1 and/or PP2. The fitted phase profile PP2 is illustrated in the figure and is indicated by PP2'. Accordingly, the phase profile $PP_n$ for the entire time interval $\Delta t$ is estimated.

In operation 720 the phase profile $PP_n$ is used to determine the accumulated phase $\Delta \varphi^n$ that is accumulated during the time interval $\Delta t$ ($\Delta \varphi^n$ can be calculated by computing the difference between the phases of first and last points of the phase profile $PP_n$).

It should be however noted that in cases where operation 720 is conducted, some ambiguity might be introduced in the thus determined accumulated phase $\Delta \varphi^n$. This is because the added phase value $D\theta$ which is used to match and fit the phase profile(s) may be ambiguous and may actually supplement $2\pi k$ value to the accumulated phase where k is any integer value (positive, negative, or zero). The ambiguity can be reduced by using e.g. the method of FIG. 5.

The ambiguity in the accumulated phase $\Delta \varphi^n$ is manifested in an ambiguity in the differential phase $\Delta \Delta \varphi^{m,n}$, which is computed e.g. in operation 130 of method 100. The ambiguity can be reduced by using e.g. the method of FIG. 6.

The method of FIGS. 7A and 7B was described in the context of the unwrapping of phases $\varphi_{p_j}^n$ of pulses of a signal $S_n$ received at receiver $Rc_n$, in order to obtain differential phases $\Delta \varphi^n$ over a given time interval (such as a dwell).

This method can be applied similarly to the unwrapping of differential phases differences $\Delta \varphi_{p_i}^{m,n}$ (or $\Delta \varphi_{pj}^{m,n}$) of each pulse. In particular, the differential phase differences between the receivers are first computed for each pulse, based on the wrapped phases of the pulses of signal Sn (see Equation 22), and then an unwrapping in compliance with the method of FIGS. 7A and 7B can be performed on the values $\Delta \varphi_{p_i}^{m,n}$ (or $\Delta \varphi_{pj,i}^{m,n}$) over a given interval, such as a dwell. Accordingly, $\Delta \Delta \varphi^{m,n}$ (or $\Delta \Delta \varphi_i^{m,n}$) can be computed after this unwrapping, by computing the difference between the differential phase differences of the last pulse and the differential phase differences of the first pulse over the time interval (see e.g. Equation 23).

It is to be noted that the various features described in the various embodiments may be combined according to all possible technical combinations.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the invention as hereinbefore described without departing from its scope, defined in and by the appended claims.

The invention claimed is:

1. A system for estimating a physical location of a signal source emitting a signal S, the system comprising at least one processor and memory circuitry configured to:
    obtain measured data indicative of a signal $S_n$ informative of the signal S and received from the signal source by each of a number of at least two receivers $\{Rc_n\}$ during time intervals $\{\Delta t_n\}$, where n is an index indicating the $n^{th}$ receiver $Rc_n$,
    obtain position data indicative of positions $\{R_n\}$ of said at least two receivers during said time intervals $\{\Delta t_n\}$ respectively;
    apply a processing to determine differential phase differences $\Delta\Delta\varphi^{m,n}$ which represent a difference between accumulated phases, $\Delta\varphi^m$ and $\Delta\varphi^n$, of the signals, $S_m$ and $S_n$, received by at least one pair $\{m,n\}$ of the receivers, $Rc_m$ and $Rc_n$ during time intervals $\{\Delta t_n\}$, $\{\Delta t_m\}$, respectively,
    apply a processing to determine a first estimate of the physical location of said signal source based on said position data and said differential phase differences $\{\Delta\Delta\varphi^{m,n}\}$ of said at least one pair $\{m,n\}$ of receivers, said first estimate being associated with an accuracy area,
    apply a processing to determine data representative of difference in times of arrival of modulation patterns of the signals $S_m$, $S_n$ received by said at least one pair $\{m,n\}$ of receivers, and
    for said at least one pair $\{m,n\}$ of receivers, use at least said data representative of difference in times of arrival of the modulation patterns of the signals, said differential phase differences $\Delta\Delta\varphi^{m,n}$, and said accuracy area to determine one or more second estimates $\hat{e}_{Src}^{k}$ of the physical location of the signal source, wherein at least some of these one or more second estimates $\hat{e}_{Src}^{k}$ of the physical location of the signal source are located within the accuracy area, and
    use the one or more second estimates $\hat{e}_{Src}^{k}$ to estimate the physical location of the signal source.

2. The system of claim 1, wherein said data representative of difference in times of arrival of modulation patterns of the signals comprises an ambiguity, wherein the system is configured to:
    use at least said accuracy area to obtain a limited set of values for said ambiguity.

3. The system of claim 2, configured to:
    for one or more values of said limited set of values for said ambiguity, determine said one or more second estimates $\hat{e}_{Src}^{k}$ of the physical location of the signal source based on a relationship relating differential phase differences $\Delta\Delta\varphi^{m,n}$ to the position data of said at least one pair $\{m,n\}$ of receivers and to the physical location of the signal source, and a relationship relating said difference in times of arrival of modulation patterns of the signals $S_m$, $S_n$ to the position data of said at least one pair $\{m,n\}$ of receivers and to the physical location of the signal source, for one or more values of the ambiguity within said limited set.

4. The system of claim 2, configured to:
    use the first estimate of the physical location of the signal source to obtain an estimate of the difference in times of arrival of the modulation patterns of the signals, and use said estimate of the difference in times of arrival of the modulation patterns of the signals, said limited set of values of said ambiguity and said differential phase differences $\Delta\Delta\varphi^{m,n}$ to determine said one or more second estimates $\hat{e}_{Src}^{k}$ of the physical location of the signal source.

5. The system of claim 1, wherein said data representative of difference in times of arrival of modulation patterns of the signals comprises an ambiguity, wherein the system is configured to:
    use the first estimate $\hat{e}_{Src}$ of the physical location of the signal source to determine $\Delta\hat{t}^{m,n}$, wherein $\Delta\hat{t}^{m,n}$ is an estimate of data representative of difference in times of arrival of the modulation patterns of the signals.

6. The system of claim 5, configured to:
    determine said one or more second estimates $\hat{e}_{Src}$ of the physical location of the signal source based on a relationship relating said differential phase differences $\Delta\Delta\varphi^{m,n}$ to the position data of the receivers and to the physical location of the signal source, and
    a relationship relating said estimate of the data representative of difference in times of arrival of the modulation patterns $\Delta\hat{t}^{m,n}$ plus a model k.PRI of said ambiguity to the position data of the receivers and to the physical location of the signal source,
    wherein k is an integer selected such that said one or more second estimates $\hat{e}_{Src}^{k}$ are within said accuracy area and wherein PRI is a pulse repetition interval of the signal S.

7. The system of claim 1, wherein said data representative of difference in times of arrival of modulation patterns of the signals comprises an ambiguity, wherein the system is configured to:
    obtain a set of limited values for said ambiguity, said obtaining comprising selecting a plurality of multiples of a pulse repetition interval of the signal S, for which associated data representative of difference in times of arrival of modulation patterns of the signals provide an estimate of the physical location of the signal source which is within the accuracy area.

8. The system of claim 1, wherein said data representative of difference in times of arrival of modulation patterns of the signals comprises an ambiguity, wherein the system is configured to:
    select an optimized set of values of said ambiguity according to an optimization criterion, said optimization criterion being representative of at least one of:
    an error of a solution to equations relating differential phase differences $\Delta\Delta\varphi^{m,n}$ to the position data of the receivers and to the physical location of the signal source, and
    an error of a solution to equations relating difference in times of arrival of modulation patterns of the signals $S_m$, $S_n$ to the position data of the receivers and to the physical location of the signal source, and
    provide said one or more second estimates $\hat{e}_{Src}^{k}$ of the physical location of the signal source based on said optimized set of values.

9. The system of claim 1, in which conditions (i) and (ii) are met:
    (i) the signal S has a constant pulse repetition interval (PRI), and
    (ii) $|\|e-s_m\|-\|-\|e-s_n\||>PRI.c$, wherein c is the speed of light, e is the physical location of the signal source, $s_m$ is the position of the receiver $Rc_m$ and $s_n$ is the position of the receiver $Rc_n$.

10. The system of claim 1, wherein the signal S has a pulse repetition frequency (PRF) which is higher or equal to 100 KHz, wherein PRF=1/PRI in which PRI is the pulse repetition interval of the signal S.

11. The system of claim 1, configured to
obtain measured data indicative of a signal $S_n$ informative of the signal S and received from the signal source by each of a number of at least two receivers $\{Rc_n\}$ during a time interval $\Delta t_i$ of a dwell i,
obtain position data indicative of positions $\{R_n\}$ of said at least two receivers during said time interval $\Delta t_i$;
apply a processing to determine differential phase differences $\Delta\Delta\varphi_i^{m,n}$ which represents a difference between accumulated phases, $\Delta\varphi_i^m$ and $\Delta\varphi_i^n$, of the signals, $S_m$ and $S_n$, received by at least one pair $\{m,n\}$ of the receivers, $Rc_m$ and $Rc_n$ during time interval $\Delta t_i$,
apply a processing to determine a first estimate of the physical location of said signal source based on position data and said differential phase differences $\Delta\Delta\varphi_i^{m,n}$ of said at least one pair $\{m,n\}$ of receivers, said first estimate being associated with an accuracy area,
apply a processing to determine data representative of difference in times of arrival of modulation patterns of the signals $S_m$, $S_n$ received by said at least one pair $\{m,n\}$ of receivers within said dwell, wherein said data comprise an ambiguity,
for said at least one pair $\{m,n\}$ of receivers, and for a plurality of said dwells, using at least said data representative of difference in times of arrival of the modulation patterns of the signals, said differential phase differences $\Delta\Delta\varphi_i^{m,n}$, and said accuracy area to determine one or more second estimates $\hat{e}_{Src}^k$ of the physical location of the signal source, wherein at least some of these one or more second estimates $\hat{e}_{Src}^k$ of the physical location of the signal source are located within the accuracy area.

12. The system of claim 11, wherein each signal $S_n$ comprises a plurality of modulation patterns $p_{j,i}^{(n)}$ within dwell i, and j an index representing the $j^{th}$ modulation pattern, wherein said determining of $\Delta\Delta\varphi_i^{m,n}$ comprises computing $\Delta\varphi_{pj,i}^{m,n}$ which is representative of the phase difference between the phase of modulation pattern $p_{j,i}^{(n)}$ received at receiver $Rc_n$ and the phase of modulation pattern $p_{j,i}^{(m)}$ received at receiver $Rc_m$, wherein the system is configured to use a bound value which bounds the value of the difference between $\Delta\varphi_{pj,i}^{m,n}$ for two consecutive modulation patterns, to limit a phase ambiguity present in $\Delta\varphi_{pj,i}^{m,n}$.

13. The system of claim 1, wherein said data representative of difference in times of arrival of modulation patterns of the signals comprises an ambiguity, wherein:
a dimension of the accuracy area has a length L,
said ambiguity is modelled as k.PRI, with PRI the pulse repetition interval of signal S, and
k is selected within a range which is between K1 and K2, wherein:

$$K_1 = \frac{\frac{-L}{2}}{PRI \cdot c} \text{ and } K_2 = \frac{\frac{+L}{2}}{PRI \cdot c}$$

14. A method of estimating a physical location of a signal source emitting a signal S, the method comprising, by at least one processor and memory circuitry:
obtaining measured data indicative of a signal $S_n$ informative of the signal S and received from the signal source by each of a number of at least two receivers $\{Rc_n\}$ during time intervals $\{\Delta t_n\}$, where n is an index indicating the $n^{th}$ receiver $Rc_n$,
obtaining position data indicative of positions $\{R_n\}$ of said at least two receivers during said time intervals $\{\Delta t_n\}$ respectively;
applying a processing to determine differential phase differences $\Delta\Delta\varphi^{m,n}$ which represent a difference between accumulated phases, $\Delta\varphi^m$ and $\Delta\varphi^n$, of the signals, $S_m$ and $S_n$, received by at least one pair $\{m,n\}$ of the receivers, $Rc_m$ and $Rc_n$ during time intervals $\{\Delta t_n\}$, $\{\Delta t_m\}$, respectively,
applying a processing to determine a first estimate of the physical location of said signal source based on said position data and said differential phase differences $\{\Delta\Delta\varphi^{m,n}\}$ of said at least one pair $\{m,n\}$ of receivers, said first estimate being associated with an accuracy area,
applying a processing to determine data representative of difference in times of arrival of modulation patterns of the signals $S_m$, $S_n$ received by said at least one pair $\{m,n\}$ of receivers, and
for said at least one pair $\{m,n\}$ of receivers, using at least said data representative of difference in times of arrival of the modulation patterns of the signals, said differential phase differences $\Delta\Delta\varphi^{m,n}$, and said accuracy area, to determine one or more second estimates $\hat{e}_{Src}^k$ of the physical location of the signal source, wherein at least some of these one or more second estimates $\hat{e}_{Src}^k$ of the physical location of the signal source are located within the accuracy area, and
using the one or more second estimates $\hat{e}_{Src}^k$ to estimate the physical location of the signal source.

15. The method of claim 14, wherein said data representative of difference in times of arrival of modulation patterns of the signals comprises an ambiguity, wherein the method comprises, by the at least one processor and memory circuitry:
using at least said accuracy area to obtain a limited set of values for said ambiguity.

16. The method of claim 15, comprising, by the at least one processor and memory circuitry:
for one or more values of said limited set of values for said ambiguity, determine said one or more second estimates $\hat{e}_{Src}^k$ of the physical location of the signal source based on a relationship relating differential phase differences $\Delta\Delta\varphi^{m,n}$ to the position data of said at least one pair $\{m,n\}$ of receivers and to the physical location of the signal source, and a relationship relating said difference in times of arrival of modulation patterns of the signals $S_m$, $S_n$ to the position data of said at least one pair $\{m,n\}$ of receivers and to the physical location of the signal source, for one or more values of the ambiguity within said limited set.

17. The method of claim 14, wherein said data representative of difference in times of arrival of modulation patterns of the signals comprises an ambiguity, wherein the method comprises:
using the first estimate of the physical location of the signal source to obtain an estimate of the difference in times of arrival of the modulation patterns of the signals, and
using said estimate of the difference in times of arrival of the modulation patterns of the signals, said limited set of values of said ambiguity and said differential phase differences $\Delta\Delta\varphi^{m,n}$ to determine said one or more second estimates $\hat{e}_{Src}^{k}$ of the physical location of the signal source.

18. The method of claim 14, wherein said data representative of difference in times of arrival of modulation patterns of the signals comprises an ambiguity, wherein the method comprises:
  using the first estimate $\hat{e}_{S_{rc}}$ of the physical location of the source to determine $\Delta\hat{t}^{m,n}$, wherein $\Delta\hat{t}^{m,n}$ is an estimate of data representative of difference in times of arrival of the modulation patterns of the signals,
  determining said one or more second estimates $\hat{e}_{S_{rc}}$ of the physical location of the signal source based on a relationship relating said differential phase differences $\Delta\Delta\varphi^{m,n}$ to the position data of the receivers and to the physical location of the signal source, and
  a relationship relating said estimate of the data representative of difference in times of arrival of the modulation patterns $\Delta\hat{t}^{m,n}$ plus a model k.PRI of said ambiguity to the position data of the receivers and to the physical location of the signal source, wherein k is an integer selected such that said one or more second estimates $\hat{e}_{Src}^{k}$ are within said accuracy area and wherein PRI is a pulse repetition interval of the signal S.

19. The method of claim 15, in which at least one of conditions (i) and (ii) is met:
  (i) the signal S has a constant pulse repetition interval (PRI), and $|\|e-s_m\|-\|e-s_n\||>$PRI.c, wherein c is the speed of light, e is the physical location of the signal source, $s_m$ is the position of the receiver $Rc_m$ and $s_n$ is the position of the receiver $Rc_n$, and
  (ii) S has a PRF which is higher or equal to 100 KHz.

20. A non-transitory computer readable medium comprising instructions that, when executed by at least one processing circuitry, cause the at least one processing circuitry to perform operations comprising estimating a physical location of a signal source, said estimating comprising:

obtaining measured data indicative of a signal $S_n$ informative of the signal S and received the signal source by each of a number of at least two receivers $\{Rc_n\}$ during time intervals $\{\Delta t_n\}$, where n is an index indicating the $n^{th}$ receiver $Rc_n$, obtaining position data indicative of positions $\{R_n\}$ of said at least two receivers during said time intervals $\{\Delta t_n\}$ respectively;

applying a processing to determine differential phase differences $\Delta\Delta\varphi^{m,n}$ which represents a difference between accumulated phases, $\Delta\varphi^m$ and $\Delta\varphi^n$, of the signals, $S_m$ and $S_n$, received by at least one pair $\{m,n\}$ of the receivers, $Rc_m$ and $Rc_n$ during time intervals $\{\Delta t_n\}$, $\{\Delta t_m\}$, respectively, applying a processing to determine a first estimate of the physical location of said signal source based on said position data and said differential phase differences $\{\Delta\Delta\varphi^{m,n}\}$ of said at least one pair $\{m,n\}$ of receivers, said first estimate being associated with an accuracy area, applying a processing to determine data representative of difference in times of arrival of modulation patterns of the signals $S_m$, $S_n$ received by said at least one pair $\{m,n\}$ of receivers, and for said at least one pair $\{m,n\}$ of receivers, using at least said data representative of difference in times of arrival of the modulation patterns of the signals, said differential phase differences $\Delta\Delta\varphi^{m,n}$, and said accuracy area to determine one or more second estimates $\hat{e}_{Src}^{k}$ of the physical location of the signal source, wherein at least some of these one or more second estimates $\hat{e}_{Src}^{k}$ of the physical location of the signal source are located within the accuracy area, and using the one or more second estimates $\hat{e}_{Src}^{k}$ to estimate the physical location of the signal source.

* * * * *